United States Patent
Bennett et al.

(10) Patent No.: US 10,067,651 B2
(45) Date of Patent: Sep. 4, 2018

(54) NAVIGABLE LAYERING OF VIEWABLE AREAS FOR HIERARCHICAL CONTENT

(71) Applicant: Thomson Reuters Global Resources Unlimited Company, Baar (CH)

(72) Inventors: Daniel Bennett, Rosemount, MN (US); John Scott Daup, Eagan, MN (US); Aaron Cooper, Cologne, MN (US); Jose Hernandez, Rosemount, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 49 days.

(21) Appl. No.: 14/081,707

(22) Filed: Nov. 15, 2013

(65) Prior Publication Data
US 2015/0143284 A1 May 21, 2015

(51) Int. Cl.
 *G06F 3/048* (2013.01)
 *G09G 5/00* (2006.01)
 *G06F 3/0484* (2013.01)
 *G06T 11/20* (2006.01)

(52) U.S. Cl.
 CPC .......... *G06F 3/0484* (2013.01); *G06T 11/206* (2013.01)

(58) Field of Classification Search
 CPC .... G06F 3/0481; G06F 3/0483; G06F 9/4843; G06F 3/017; G06F 3/04886; G06F 3/016
 USPC ......... 715/810, 794, 767; 345/173, 419, 661
 See application file for complete search history.

(56) References Cited

U.S. PATENT DOCUMENTS

| | | | | |
|---|---|---|---|---|
| 5,644,737 A * | 7/1997 | Tuniman et al. | | 715/810 |
| 6,040,833 A * | 3/2000 | Henshaw | | 715/794 |
| 6,511,426 B1 * | 1/2003 | Hossack et al. | | 600/437 |
| 7,308,651 B2 * | 12/2007 | Kling et al. | | 715/709 |
| 7,456,823 B2 * | 11/2008 | Poupyrev et al. | | 345/173 |
| 2001/0024195 A1 * | 9/2001 | Hayakawa | | 345/173 |
| 2004/0085364 A1 * | 5/2004 | Keely et al. | | 345/804 |
| 2008/0079692 A1 * | 4/2008 | Liang | | G06F 3/016 345/156 |
| 2011/0145758 A1 * | 6/2011 | Rosales et al. | | 715/794 |
| 2011/0225542 A1 * | 9/2011 | Schmieder et al. | | 715/794 |
| 2011/0296351 A1 * | 12/2011 | Ewing et al. | | 715/841 |

(Continued)

OTHER PUBLICATIONS

Beaudoin L et al: "Cheops: a compact explorer for complex hierarchies", Visualization '96. Proceedings, IEEE, NE, Oct. 27, 1996, pp. 87-92.

(Continued)

*Primary Examiner* — Jennifer To
*Assistant Examiner* — Jasmine Wan
(74) *Attorney, Agent, or Firm* — McCarter & English, LLP

(57) ABSTRACT

Exemplary embodiments are generally directed to navigable layering of viewable areas corresponding to a hierarchical structure of computer-readable content. In exemplary embodiments, a stack of viewable areas including a first viewable area and a second viewable area can be rendered on a display within a footprint area. An order of the viewable areas in the stack can correspond to a hierarchical relationship of computer-readable content and the viewable areas can include information associated with the hierarchical relationship. The second viewable area in the stack can be adjusted, for example, by resizing and/or repositioning the second viewable area, based on a compression criteria to accommodate the viewable areas of the stack within the footprint.

12 Claims, 12 Drawing Sheets

(56) References Cited

U.S. PATENT DOCUMENTS

| | | | |
|---|---|---|---|
| 2012/0236037 A1* | 9/2012 | Lessing | G06F 3/017 |
| | | | 345/661 |
| 2013/0104065 A1* | 4/2013 | Stecher | 715/767 |
| 2013/0127826 A1* | 5/2013 | Walton et al. | 345/419 |
| 2013/0145307 A1* | 6/2013 | Kawasaki | G06F 3/04886 |
| | | | 715/781 |
| 2013/0174179 A1* | 7/2013 | Park et al. | 718/107 |
| 2014/0115432 A1* | 4/2014 | Turner | 715/205 |
| 2014/0380247 A1* | 12/2014 | Tecarro et al. | 715/863 |

OTHER PUBLICATIONS

Kumar H P et al: "Browsing hierarchical data with multi-level dynamic queries and pruning", International Journal of Human Computer Studies, Academic Press, New York, NY, US, vol. 46, No. 1, Jan. 1, 1997, pp. 103-124.

Stuart K Card et al: "Degree-of-Interest Trees: A Component of an Attention-Reactive User Interface 001 Vis UI Data User 001 Vis UI Data", Advanced Visual Interface, ACM XP55183138A, May 22, 2002. (6 pages).

David A Nation: "Visualizing websites using a hierarchical table of contents browser: WebTOC", Jan. 1, 2003, The Craft of Information Visualization: Readings and Reflections, pp. 199-210.

International Search Report and Written Opinion from related international application PCT/IB2014/003024 dated May 15, 2015.

* cited by examiner

NAVIGABLE LAYERING OF VIEWABLE AREAS FOR HIERARCHICAL CONTENT

BACKGROUND

Navigating a hierarchical structure in computer-readable content can be difficult as the depth of the hierarchy increases. For example, some electronic books (e-books) and other digital content can be arranged in a defined structure and can include a table of contents reflecting the structure. Some users may wish to navigate to different sections in an e-book based on the table of contents to find relevant portions of the e-book. For applications where the display size is small (e.g., displays on smartphones and tablets), it can be difficult to fit or view the table of contents. Some applications may allow a user to navigate from one screen to another to view different portions of the hierarchy. These conventional applications, however, often do not provide a user with a sense of the users position within the hierarchy and often do not provide the user with an easy and efficient way to go back in the table of contents hierarchy.

While applications exist that allow user to move through hierarchical structures associated with computer-readable content, features which provide enhanced navigation with improved usability remain a desirable objective.

SUMMARY

Exemplary embodiments generally provide for navigable layering of viewable areas for hierarchical content. As one example, exemplary embodiments of the present disclosure can advantageously facilitate hierarchical navigation of a table of contents (TOC) of an electronic text to allow a user to view and navigate through a (complete) TOC hierarchy so that the user can identify, observe, or traverse the TOC hierarchy. The navigable layering implemented by exemplary embodiments of the present disclosure can advantageously provide a mechanism that allows a user to see a previously navigated hierarchy path in addition to a current path. In exemplary embodiments, the navigable layering of viewable areas based on a hierarchy of computer-readable content can allow a user to easily and intuitively transition between different consecutive or non-consecutive layers (or tiers) of the hierarchy.

In accordance with embodiments of the present disclosure, a computer-implemented method of navigable layering of viewable areas corresponding to a hierarchical structure of computer-readable content is disclosed. The method includes executing code to render a stack of viewable areas on a display device. The stack of viewable areas can include a first viewable area and a second viewable area. Each of the viewable areas of the stack can be rendered within a footprint having a height and a width and an order of the viewable areas in the stack can correspond to a hierarchical relationship of computer-readable content. The method also includes programmatically adjusting the second viewable area in the stack based on a compression criteria to accommodate the viewable areas in the stack within the footprint. The viewable areas in the stack include information associated with the hierarchical relationship and the second viewable area overlays the first viewable area.

In accordance with embodiments of the present disclosure, a system for navigable layering of viewable areas corresponding to a hierarchical structure of computer-readable content is disclosed. The system includes one or more non-transitory computer-readable media and one or more processing devices. The one or more non-transitory computer-readable media stores one or more programs. The one or more processing devices are operatively coupled to the one or more non-transitory computer-readable media and are programmed to execute the one or more programs to render a stack of viewable areas on a display device. The stack of viewable areas include a first viewable area and a second viewable area. Each of the viewable areas of the stack can be rendered within a footprint having a height and a width and an order of the viewable areas in the stack can correspond to a hierarchical relationship of computer-readable content. The one or more processing device are also programmed to executed the one or more programs to programmatically adjust the second viewable area in the stack based on a compression criteria to accommodate the viewable areas in the stack within the footprint. The viewable areas in the stack include information associated with the hierarchical relationship and the second viewable area overlays the first viewable area.

In accordance with embodiments of the present disclosure a non-transitory computer-readable medium storing instructions is disclosed. Execution of the instructions by a processing device causes the processing device to implement a process for navigable layering of viewable areas corresponding to a hierarchical structure of computer-readable content. The instructions include code for rendering a stack of viewable areas on a display. The stack of viewable areas include a first viewable area and a second viewable area. Each of the viewable areas of the stack can be rendered within a footprint having a height and a width and an order of the viewable areas in the stack can correspond to a hierarchical relationship of computer-readable content. The instructions include also include code for adjusting the second viewable area on the display based on a compression criteria to accommodate the viewable areas of the stack within the footprint. The viewable areas in the stack include information associated with the hierarchical relationship and the second viewable area overlays the first viewable area.

In some embodiments, the compression criteria can be based on a quantity of viewable areas in the stack. The adjusting of the second viewable area can include resizing at least one dimension of the second viewable area and/or repositioning the second viewable area with respect to the first viewable area. A resized dimension of the second viewable area can correspond to an increase in the dimension.

In some embodiments, rendering the stack of viewable areas can include displaying the first viewable area via the display device and overlaying at least one intervening viewable area onto at least a portion of the first viewable area to obstruct a portion of the first viewable area and so that the first viewable area has a first visible portion that is less than the footprint. The first viewable area can correspond to a root of the hierarchical structure and can include at least one selectable object associated with the hierarchical relationship. The second viewable area can be displayed in response to detecting selection of the at least one selectable object or at least one selectable object on intervening viewable areas disposed between the first and second viewable areas. The second viewable area can be overlaid onto at least a portion of the intervening viewable areas to obstruct a portion of the at least one intervening viewable area and so that the intervening viewable areas have a reduced visible portions. A top viewable area can be overlaid onto at least a portion of the second viewable area to obstruct a portion of the second viewable area and so that the second viewable area has an third visible portion, the top viewable area being unobstructed and visible on the display device.

In some embodiments, the viewable areas can each be rendered to have a different width and can be rendered to have identical heights. A right edge of each of the viewable areas can be aligned so that the stack of viewable areas has an offset overlapping arrangement. The visible portions of each of the viewable areas can together form a total visible area within the footprint. The visible portion corresponding to a root viewable area can have a first specified minimum dimension and/or a current (top) viewable area can have a second specified minimum dimension.

In some embodiments, at least one of the viewable areas in the stack can be adjusted so that another one of the viewable areas in the stack is not visible on the display device.

In some embodiments, at least some of the viewable areas can be at least partially obstructed and at least two of the viewable areas in the stack can have visible unobstructed portions that have an equal area.

In some embodiments, the footprint can define a total visible viewing area and visible portions of the viewable areas in the stack are displayed in the total visible viewing area. At least one dimension of at least one of the visible portions can be adjusted based on a configurable threshold associated the total visible viewing area.

In some embodiments, the first viewable area can be displayed to include a selectable object corresponding to the computer-readable content. The second viewable area can include a selectable object corresponding to computer-readable content and can be overlaid onto at least a portion of the first viewable area to reduce a first visible viewing area of the first viewable area in response to detecting selection of the selectable object of the first viewable area. A third viewable area can include a selectable object corresponding to the computer-readable content and can be overlaid onto at least a portion of the second viewable area to reduce a second visible viewing area of the second viewable area in response to detecting selection of the selectable object of the second viewable area. To accommodate the viewable areas within the footprint, the second visible viewing area of the second viewable area can be compressed to create a compressed visible viewing area for the second viewable area that is less than the second visible viewing area.

Any combination of embodiments is envisioned. Other objects and features will become apparent from the following detailed description considered in conjunction with the accompanying drawings. It is to be understood, however, that the drawings are designed as an illustration only and not as a definition of the limits of the present disclosure.

DESCRIPTION OF EXEMPLARY EMBODIMENTS

Exemplary embodiments of the present disclosure generally relate to techniques for providing an enhanced and robust user experience for accessing hierarchical content via computing devices including desktop computers, mobile electronic devices or portable electronic devices, such as tablets or smartphones, and the like. As one non-limiting example, these techniques provide for the navigation of table of contents (TOC) hierarchies and encompass displaying a complete TOC hierarchy to a user for selected content as well as for allowing the user to easily and intuitively navigate the levels of the TOC hierarchy. A set of overlapping viewable areas (or "slats") make up the levels and together form a stack.

In exemplary embodiments, a variable, configurable, and/or fixed threshold or compression criteria can used to determine a manner in which to compress the stack so that the top slat(s) and all associated content on a current (top) viewable area can be visible and/or at least a portion of root viewable area and its content can be visible. Intervening non-surfaced viewable areas (e.g., completely or partially obstructed viewable areas) can be accessible by the user, although the associated content of the intervening non-surfaced viewable areas may not be visible. Exemplary embodiments of the present disclosure can also advantageously implement a "peek" operation to allow the user to readily view the content of obstructed or partially obstructed viewable areas of the stack and/or can provide one or more mechanisms that allow the user to navigate backwards and forwards through the hierarchical structure represented by and/or in the viewable areas.

Figure 1:
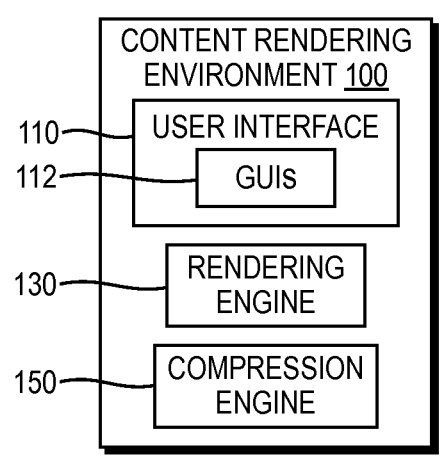
FIG. 1 is a block diagram of an exemplary computer-readable content rendering environment according to exemplary embodiments of the present disclosure.

FIG. 1 is a block diagram of an exemplary computer-readable content rendering environment 100. Exemplary embodiments of the environment 100 can be implemented using hardware, software, and/or a combination thereof. As one example, in some embodiments, a computing device can be programmed and/or configured to implement exemplary embodiments of the environment 100. An exemplary embodiment of a computing device programmed and/or configured to implement embodiments of the environment 100, or portions thereof, is shown, for example, in FIG. 10.

In some embodiments, the environment 100 can be an electronic book reading application (e.g., an e-reader application) that allows users to read electronic books (e-books) or other texts, can be utilized in conjunction with an e-reader application, and/or can be implemented to facilitate hierarchical navigation of structured computer-readable content in an electronic environment.

The environment 100 can be programmed and/or include executable code to implement navigable layering of viewable areas rendered on a display associated with a computing device. The viewable areas can be hierarchically arranged based on a structure of computer-readable content included in or referenced by the viewable areas. In exemplary embodiments, the environment 100 can include a user interface 110, a rendering engine 130, and a compression engine 150.

The user interface 110 can be programmed and/or configured to provide one or more graphical user interfaces (GUIs) 112 through which a user can interact with the environment 100. The GUIs 112 displayed to users can include data entry areas to receive information from the user; user-selectable elements or areas that can be selected by the user to cause the environment 100 to perform one or more operations, functions, and/or processes; and/or can include data outputs to display information to the user.

The rendering engine 130 can be programmed and/or configured to interact with the user interface 110 to render data/information via one or more of the GUIs 112 on a display according to one or more parameters and/or settings and/or in response to user inputs received via the user interface 110. For example, in exemplary embodiments, the rending engine 130 can be programmed and/or configured to render a data/information in viewable areas corresponding to a hierarchical structure of computer-readable content in a data structure, such as a computer-readable file and/or a database. In some embodiments, the content of the data structure can be, for example, an electronic book (e-book) having a table of contents (TOC) and the data/information rendered in each of the viewable areas can correspond a layer or tier of the TOC hierarchy as described herein. In some embodiments, the data/information rendered in each of the viewable areas can be, for example, search results for one or more terms in data structure (e.g., an e-book), and the search results rendered in each of the viewable areas can correspond to a layer or tier of the content hierarchy within which the one or more terms appear.

In exemplary embodiments, the rendering engine 130 can be programmed and/or configured to layer the viewable areas in an ordered sequence corresponding to the hierarchical structure of the content of the data structure. For example, a viewable area including data/information corresponding to the root level or tier in the hierarchy can be rendered as a first viewable area or root viewable area. As a user descends into the hierarchical structure of the content of the data structure (e.g., by sequentially selecting data/information within the viewable areas), the rendering engine 130 can overlay viewable areas on the root viewable area. The viewable areas overlaying the root viewable areas can cover a portion of the root viewable area, while leaving a portion of the root viewable area exposed such that a user can view and/or interact with the root viewable area. The viewable area corresponding to a current level or tier in the hierarchical structure being viewed by the user (e.g., the top viewable area) can overlay the remainder of the viewable areas such that data/information of the current level or tier can be viewed by the user without obstruction from the remaining viewable areas.

The rendering engine 130 can define a total viewable window. The rendering engine 130 can control or specify overall dimensions of a total viewable window within which the viewable areas can be rendered and/or can define a footprint area within which the viewable areas can be rendered, where the footprint area can be encompassed by the total viewable window. For example, in some embodiments, the rendering engine 130 can be programmed and/or configured to generate a total viewable window that has a specified width and height on the display screen. In some embodiments, the dimensions of the total viewable window are not specified by the rendering engine 130. In some embodiments, the rendering engine 130 can adjust or resize the total viewable window based on user input and/or device parameters. As one example, a user may resize the total viewable window by selecting a border of the window and dragging the border. As another example, the rending engine 130 can be programmed to obtain and/or identify device specific information corresponding to the electronic device on which the total viewable window is to be displayed and can render the window based on dimensions of a display screen associated with the electronic device. As yet another embodiment, the total viewable window can be resized upon a transition from a portrait view to a landscape view or vice versa. In some embodiments, the window can be displayed by the rendering engine 130 automatically and/or can be displayed by the rendering engine 130 in response to user input via a GUI 112 of the user interface 110.

The footprint area can be defined as a container data structure in the environment 100. The rendering engine 130 may or may not know the dimensions of the footprint area. In some embodiments, the rendering engine 130 can control or specify overall dimensions of the root viewable area within the footprint area. As one example, the rendering engine 130 can be programmed and/or configured to render the root viewable area to be coextensive with the footprint area such that the root viewable area has a width and height that is equal to a width and height of the footprint area. For embodiments, in which the root viewable area and the footprint area are coextensive, the width and height of the root viewable area can be interchangeably referred to herein as the footprint area. When the rendering engine 130 overlays viewable areas over the root viewable area, the rendering engine 130 can be programmed and/or configured to render the viewable areas within the footprint area.

To achieve overlaying of viewable areas, in some embodiments, the rendering engine 130 can control and/or specify a z-depth of the viewable areas relative to each other, where the z-depth refers to a perceived or virtual depth of a viewable area rendered on display measured along an axis that is perpendicular to a plane of the display screen. In some embodiments, the rendering engine 130 can be programmed and/or configured to specify a z-depth for the root viewable and to increment the z-depth for each viewable area rendered thereafter. In some embodiments, the rendering engine 130 can be programmed and/or configured to specify an initial z-depth for the root viewable, decrement the z-depth of the root viewable area when a new viewable area is rendered on the display, and set the z-depth the new viewable area to the initial z-depth. As the rendering engine 130 renders additional overlaying viewable areas, the z-depth of each previously rendered viewable areas can be decremented and the last viewable area rendered can specified to have the initial z-depth.

The viewable areas rendered on the display by the rendering engine 130 can form a stack of viewable areas with an offset overlapping arrangement of the viewable areas relative to each other. Each of the viewable areas in the stack (or set) can have a different z-depth. A bottom (or rear) of the stack can be defined by the root viewable area, a top of the stack can be defined by the current (top) viewable area (e.g., the foremost viewable area that is unobstructed by any of the other viewable areas), and the remaining viewable areas in the stack can be disposed between the root viewable area and the current viewable area (e.g., non-surfaced intervening viewable areas). The remaining viewable areas can be partially covered and the visible widths of the remaining viewable areas can depend on a total number of viewable areas displayed. The viewable areas in the stack can be referred to as slats and can be rendered to look and feel like a stack of slats in a window shade with drop shadows to provide a sense of depth and perspective.

To achieve an offset overlapping stack arrangement, in exemplary embodiments, viewable areas rendered to overlay the root viewable area can have a height that is generally coextensive with the height of the root viewable area such that a top and bottom of the viewable areas terminate with a top and bottom of the root viewable area, while a width of the viewable areas overlaying the root viewable area can be less than the width of the root viewable area. The rendering engine 130 can render the viewable areas over the root viewable area to have offset left edges and to be aligned along a right edge of the footprint area.

In some embodiments, a minimum width can be specified for the current (top) viewable area (the foremost unobstructed viewable area) rendered on the display by the rendering engine 130. In some embodiments, a minimum width may not be specified for the current (top) viewable area, as described in more detail herein. In some embodiments, the minimum width can be statically defined such that the minimum width of the current (top) viewable area is fixed. In some embodiments, the minimum width can be dynamically defined such that the minimum width of the current (top) viewable area can change. In some embodiments, the minimum width of the current (top) viewable area can be specified as a percentage or ratio of the width of the footprint defined by the root viewable area such that as the width of the footprint changes, the minimum width of the current viewable area can change. In some embodiments, the minimum width of the current (top) viewable area can be approximately 55% of the width of the footprint (e.g., the width of the root viewable area).

The rendering engine 130 can be programmed and/or configured to render the viewable areas (i.e. slats) in a stack based on a specified minimum width of a visible portion of the root viewable area when other viewable areas are overlaid on the root viewable area so that at least a portion of the root viewable area is visible (e.g., unobstructed by overlaid viewable areas). The minimum width of the visible portion of the root viewable area can be specified to define a minimum offset between the left edge of the root viewable area and a left edge of a viewable area that overlays the root viewable area. In some embodiments, the minimum width of the visible portion of the root viewable area can be statically defined such that the minimum width of the visible portion is fixed. In some embodiments, the minimum width of the visible portion can be dynamically defined such that the minimum width of the visible portion can change. In some embodiments, the minimum width of the visible portion can be specified as a percentage or ratio of the width of the footprint defined by the root viewable area such that as the width of the footprint changes, the minimum width of the visible portion can change. In some embodiments, the minimum width of the visible portion of the root viewable area can be approximately 10% of the width of the footprint (e.g., the width of the root viewable area).

A width of each viewable areas that overlays the root viewable area can be specified based on an offset applied to the left edge of the viewable areas relative to the left edge of the footprint area (and therefore the left edge of the root viewable area) such that as viewable areas are added to the stack, the viewable areas appear to extend a lesser distance leftward from the right edge as the distance away from the root viewable area increases (e.g., as the user descends further into the hierarchical structure and/or as the z-depth increases) such that a visible portion of a given viewable area between the root viewable area and the current viewable can be determined by an offset applied to a viewable area immediately in front of the given viewable area (e.g., one level further into the hierarchy than the given viewable area). In exemplary embodiments, an amount of the viewable areas between the root viewable area and the current viewable area that are visible can be set by the rendering engine 130 as determined by the compression engine 150. In some embodiments, the visible portions of the viewable areas between the root viewable area and the current (top) viewable area can correspond to approximately 35% of the width of the foot print (e.g., the width of the root viewable area).

The data/information displayed in the viewable areas can be arranged in rows, where each row can correspond to a different path through the hierarchical structure of the content associated with the data/information. For example, in some embodiments, the hierarchical structure can correspond to tree structures that each have a single root node and one or more leaf (terminal) nodes, where each a path from the root node to each leaf node is a unique path through the hierarchy. In some embodiments, each viewable area can be rendered to display a set of rows representing entries in a TOC of an e-book. The TOC entries can be, for example, section headings and/or chapters of an e-book. The entries of the TOC displayed in a viewable area correspond to the same tier or level in the hierarchical structure. Entries in each of the rows can be selectable by a user to descend to the next level or tier of the hierarchy such that the entry can be selectable to navigate to a viewable area that displays children TOC elements of the selected entry. A visual indicator (e.g., an arrow) can be display in those rows of a viewable that have children TOC entries to identify the rows of the viewable area that have user selectable entries and associated children TOC entries. In some embodiments, the visual indicator can be selectable to navigate the hierarchy. Likewise, to indicate entries in the viewable areas that have been selected, exemplary embodiments of the rendering engine 130 can be programmed and/or configured to render another visual indicator (e.g., a vertically oriented color bar), which can be used to distinguish elements selected by the user as navigation progresses in the TOC and also to identify a path through the hierarchy being followed by a user from the root viewable area to the current viewable area. In some embodiments, the content of a selected row can have a different color then the unselected rows to indicate that the content has been selected.

Exemplary embodiments of the rendering engine 130 can be programmed and/or configured to implement a "peek" operation. The peek operation can allow a user to view the content of a viewable area that is obstructed by overlaying viewable areas. To allow a user to peek at a selected viewable area in the stack, the rendering engine 130 can move or remove the overlaying viewable areas.

In some embodiments, a hover function can be used to select a viewable area during the peek operation. For example, a pointer can be moved over the viewable area using a pointing device to reveal the content of the viewable area. When the user moves the pointer away from the viewable area, the viewable area can return to its position in the stack.

In some embodiments, a user can implement the peek operation by touching a viewable area(s) to be moved via a touch sensitive surface, such as a touch-screen, a a haptic display, and the like, which can make the viewable area(s) "stick" to the user's finger allowing the user to drag the covering or overlaying viewable areas away from the covered or obstructed viewable area to reveal more of the content of the selected viewable area. For example, while the user is touching the surface, a pan gesture, defined as the user executing a swipe like motion while keeping the finger on the touch surface, can be used to implement the peek operation. Once the peek operation is performed, the viewable area(s) that have been moved by the pan gesture can be moved further to the right beyond a configurable threshold point to dismiss or remove the viewable areas from the display to allow user to navigate back to a previously displayed viewable area in the stack or the held viewable areas can be released before reaching the threshold point to allow the viewable areas to snap back to their original position to overlay and obstruct at least a portion of the viewable area. In some embodiments, a detection of a speed with which the user's finger performs the pan gesture can used to determine whether to remove covering viewable areas during a peek (e.g., a quick flick of the finger can be used to send covering viewable areas away).

Alpha channel adjustments can be implemented by the rendering engine 130 to control a level of light (or brightness) given to viewable areas as the user peeks or drags viewable areas around, so covered or overlaid viewable areas look darker than exposed or unobstructed viewable areas.

The rendering engine 130 can be programmed and/or configured to allow a user to navigate back to previously navigated levels or tiers of the hierarchy using an intuitive selection mechanisms. As one example, in some embodiments, a user can select any at least partially obstructed viewable and the viewable areas overlaying the selected viewable area can be removed from the display. To select an at least partially obstructed viewable area, the user can, for example, click on the viewable area with a pointing device or touch the viewable area via a touch-screen enabled display. As another example, as described herein, a user can select and hold a viewable areas immediately overlaying the viewable area that the user wishes to navigate back to during a "peek" operation and the user can drag the viewable areas covering the viewable area away to remove the viewable areas from the display. As yet another example, to remove viewable areas the user can use a pointing device to select and hold the viewable areas by clicking on and holding down a button of the pointing device and can gesture on or move the pointing device to the left or right or touch the viewable area via a touch-screen enabled display and then swipe the viewable areas to the left or right.

The compression engine 150 can be programmed and/or configured to determine an amount of the viewable areas between the root viewable area and the current (top) viewable area that are visible (e.g., not obstructed by the offset overlapping arrangement of the viewable areas). As described herein, in some embodiments, the root viewable area in the hierarchy has a minimum width for its visible area when other viewable areas are overlaid on the root viewable area so that at least a portion of the root viewable areas is visible regardless a quantity of viewable areas that are overlaying the root viewable area. As described herein, the current (top) viewable area that is not covered by any other viewable areas may or may not have a minimum width. The remaining viewable areas fill a space between the root and current (top) viewable areas and each of these viewable areas can have visible widths (e.g., portion of the viewable areas that are not covered by other viewable areas) that can depend on a total number of viewable areas that have been rendered on the display.

To accommodate large hierarchies with many levels, the compression engine 150 can be configured to implemented a configurable threshold to compress at least some of the viewable areas between the root viewable area and the current viewable area so the content in the root and a configurable number of top viewable areas (e.g., the current viewable area and viewable areas immediately preceding or behind the current viewable area) are at least partially visible. Viewable areas between the root and the "fixed" number top viewable areas can be compressed and their content may potentially be completely covered and not visible. In some embodiments, the root viewable area can be completely covered (i.e. no minimum width for the visible portion of the root viewable area) or the information/data in the root viewable area can be covered, but a portion of the root viewable area can still be visible.

In exemplary embodiments, the compression engine 150 can segment or divide the footprint area into different display areas. The display areas can determine how slats (i.e. viewable areas) can be displayed by reducing (compressing) the visible portion of any of the slats. For illustrative purposes, the compression engine 150 can define five display areas within the footprint area, such that if five or less slats are rendered on the display device, none of the visible portions of the slats are compressed (e.g., each slat has a visible portion with at least a default width). However, if six slats are rendered on the display device, at least one of the display areas will be shared by visible portions of two slats (e.g., the two visible portions are compressed into a single display area). The compression engine 150 can determine a width of compressed visible portions of the slats by defining a collapse display area (or compression area) with a configurable width that is located adjacent to a visible portion of the root slat. The width of the collapse area can be equally distributed between all the slats to be compressed by the compression engine 150. As more slats are displayed, more of slats are included in the collapse display area effectively reducing the width of their visible portions, while maintaining a constant width of a visible portion of the root slat and/or a constant minimum width of the current (top) slat.

While an exemplary embodiment of the environment 100 has been illustrated with the user interface 110, the rendering engine 130, and the compression engine 150 as separate components, those skilled in the art will recognize that one or more of the user interface 110, rendering engine 130, and compression engine 150 can be integrated with each other. Furthermore, while an exemplary embodiment of the environment 100 includes the user interface 110, rendering engine 130, and compression engine 150 those skilled in the art will recognize that in exemplary embodiments the operations, function, and/or processes of the user interface 110, rendering engine 130, and compression engine 150 can be implemented be more or fewer components.

Figure 2:
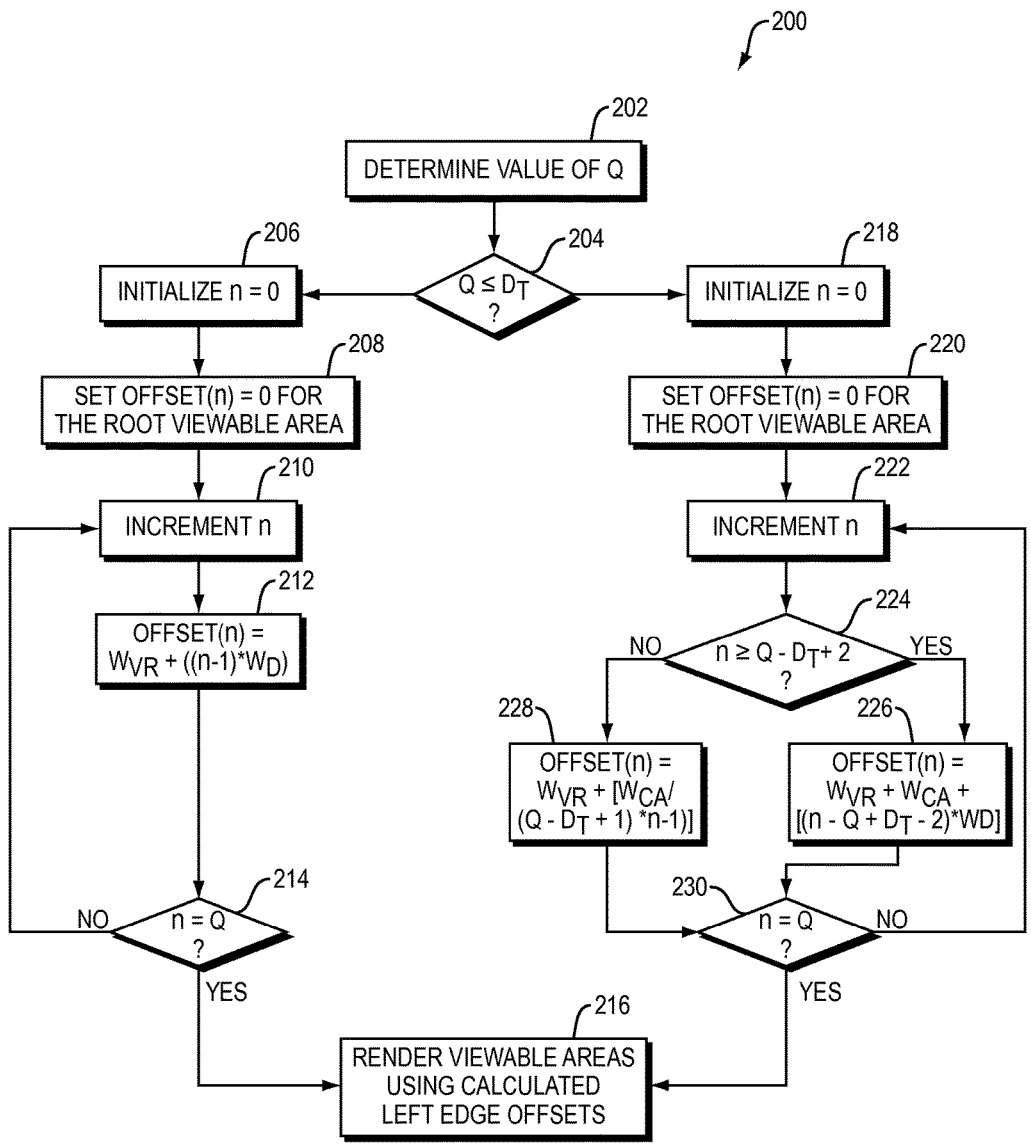
FIG. 2 is a flowchart illustrating a process implemented by an exemplary embodiment of the present disclosure for determining an overlapping arrangement of viewable areas corresponding to a hierarchical structure of underlying computer-readable content.

FIG. 2 is a flowchart illustrating an exemplary process 200 that can be implemented by the compression engine 150 using a compression criteria for determining a width of visible portions of viewable areas between the root viewable area and the current viewable area. Exemplary embodiments of the process 200 can calculate an offset for a left edge of each of the viewable areas in the stack relative to a left edge of the footprint and can define display areas including root display area having a minimum visible width for the root viewable area, a compression area, and any non-compressed viewable areas behind the current (top) viewable. The process can be implemented without specifying a minimum width of a current (top) viewable areas and/or can be implemented to provide a configurable maximum number of visible areas in the footprint before visible portions of at least some of the viewable areas are reduced (compressed). In exemplary embodiments, the process 200 can be executed to facilitate rendering of viewable areas in a footprint area without knowing the dimensions of the footprint area by specifying the offset of each viewable area from the left edge of the foot print and specifying the viewable areas to extend from their left edges to the right edge of the footprint, such that the viewable area form insets within the footprint area. For the process 200, "n" denotes a viewable area index that corresponds to a position of a viewable in the stack of viewable areas (e.g., n=0 corresponds to the root viewable area and n=1 corresponds to a viewable area that directly overlays the root viewable area), "Q" denotes a quantity of viewable areas in the stack, "$D_T$" denotes a display area threshold that defines a number of display areas in which the viewable areas can be displayed, "$W_D$" denotes a default width of a visible portion of a viewable area which is not compressed, "$W_{VR}$" denotes the minimum width of the visible portion of the root viewable area, "$W_{CA}$" denotes a width of a compression area (e.g., an area on the display in which visible portions of the viewable areas are compressed), and "offset" denotes a position of a left edge of a viewable area with respect to a left edge of the footprint.

At step 202, the compression engine 150 can execute the process 200 to determine the quantity Q of viewable areas to be rendered on a display device. At step 204, the compression engine 150 can determine whether the quantity Q of viewable areas to be rendered on the screen is less than or equal to the display area threshold $D_T$ ($Q \leq D_T$). If so, the compression engine 150 can implement a first sub-process that renders the viewable areas between the root viewable area and the current (top) viewable area to have visible portions that are equal to the minimum width (i.e. by specifying an left edge offset of each of the viewable areas based on a left edge of the footprint). In the first sub-process, the compression engine can initialize the viewable area index to zero at step 206 and can set the left edge offset for the root viewable area to zero at step 208 (i.e. offset(0)=0). At step 210, the compression engine 150 can increment the viewable area index to set the left edge offset for the next consecutive viewable area in the stack. At step 212, the compression engine 150 can determine the left edge offset of the viewable area associated with the viewable area index by evaluating the following mathematical expression at step 210.

$$\mathrm{offset}(n) = W_{VR} + ((n-1) * W_D) \quad (1)$$

For example, when $D_T=5$, the offset of the left edges of the viewable areas from the left edge of the footprint, for n=0:4 and S=5, can be determined as follows where the quantity of viewable areas S=5 is less than or equal to the display area threshold $D_T=5$.

Viewable Area 0(root): offset(0)=0

Viewable Area 1: offset(1)=$W_{VR}$

Viewable Area 2: offset(2)=$W_{VR}+W_D$

Viewable Area 3: offset(3)=$W_{VR}+(2*W_D)$

Viewable Area 4: offset(4)=$W_{VR}+(3*W_D)$

In the above example, the left edge of each viewable area is offset by a multiple of the default width $W_D$, based on Equation 1, such that the visible portions of the partially obstructed viewable areas 1-3 have the same width.

At step 214, the compression engine 150 determines whether the viewing area index has been incremented to equal the quantity Q of viewable areas to be rendered on the display device (n=Q). If the viewable area index does not equal to the quantity of viewable areas to be rendered on the display device, the sub-process repeats from step 210. If the viewable area index equals the quantity of viewable areas to be rendered on the display device, the compression engine 150 can provide the rendering engine 130 with the calculated offset values and the rendering engine can render the viewable areas on the display device to have visible portions based on the offset values at step 216.

Returning to step 204, the compression engine 150 can implement a second sub-process if the quantity of viewable areas to be rendered exceeds the display area threshold ($Q>D_T$). In the second sub-process, the compression engine 150 can initialize the viewable area index to zero at step 218 and can set the left edge offset for the root viewable area to zero at step 220 (i.e. offset(0)=0). At step 222, the compression engine 150 can increment the viewable area index to set the left edge offset for the next consecutive viewable area in the stack. At step 224, the compression engine determines whether the left edge of the viewable area corresponding to the viewable area index is positioned within the collapse area (n≤S−MD+2). If so, the compression engine 150 can determine the left edge offset of the viewable area by evaluating the following mathematical expression at step 228.

$$\mathrm{offset}(n) = W_{VR} + (W_{CA}/(Q-D_T+1)*(n-1)) \quad (2)$$

Otherwise, the compression engine 150 can determine the left edge offset of the viewable area by evaluating the following mathematical expression at step 226.

$$\mathrm{offset}(n) = W_{VR} + W_{CA} + ((n-Q+D_T-2)*W_D) \quad (3)$$

In either case, the second sub-process proceeds to step 230 to determine whether the viewing area index is equal to the quantity of viewable areas to be rendered on the display device (n=Q). If the viewing area index does not equal to the quantity of viewable areas to be rendered on the display device, the second sub-process repeats from step 222. If the viewing area index equals to the quantity of viewable areas to be rendered on the display device, the compression engine 150 can provide the rendering engine 130 with the calculated offset values and the rendering engine can render the viewable areas on the display device to have visible portions based on the offset values at step 216.

For example, when $D_T=5$, the offset of the left edges of the viewable areas from the left edge of the footprint, for n=0:5 and Q=6, can be determined as follows where the quantity of viewable areas Q=6 is greater than the display area threshold $D_T=5$.

Viewable Area 0(root): offset(0)=0.

Viewable Area 1: offset(1)=$W_{VR}$

Viewable Area 2: offset(2)=
$W_{VR}+[W_{CA}/(6-5+1)*(2-1)]$

Viewable Area 3: offset(3)=
$W_{VR}+W_{CA}+((3-6+5-2)*W_D)$

Viewable Area 4: offset(4)=
$W_{VR}+W_{CA}+((4-6+5-2)*W_D)$

Viewable Area 5: offset(5)=
$W_{VR}+W_{CA}+((5-6+5-2)*W_D)$

In the above example, viewable areas 1 and 2 have compressed visible portions, while the viewable areas 3 and 4 each have visible portions with a default width $W_D$. The offset for viewable areas 1 and 2 can be determined based on Equation 2, while the offset for viewable areas 3-5 can be determined by Equation 3.

Figure 3:
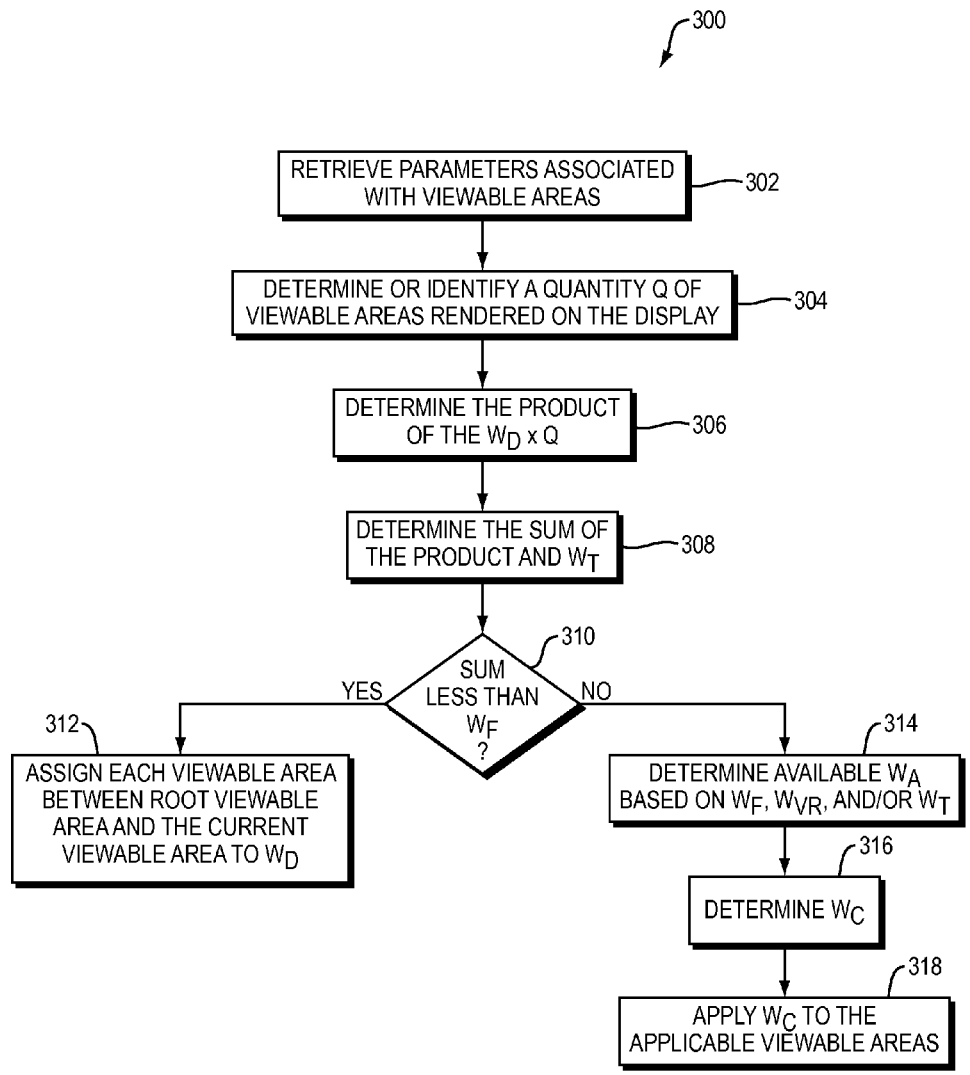
FIG. 3 is a flowchart illustrating a process implemented by another exemplary embodiment of the present disclosure for determining an overlapping arrangement of viewable areas corresponding to a hierarchical structure of underlying computer-readable content.

FIG. 3 is a flowchart illustrating an exemplary process 300 that can be implemented by the compression engine 150 using a compression criteria for determining a width of visible portions of viewable areas between the root viewable area and the current viewable area. To begin, the compression engine can retrieve parameters associated with viewable areas to be rendered on a display device at step 302, including, for example, a width of the footprint $W_F$ of the root viewable area rendered on the display, a specified minimum width $W_{VR}$ for the visible portion of the root viewable area, a specified minimum width $W_T$ of a current viewable area, and/or an ideal or default width $W_D$ of the visible portion of each viewable area between the root viewable area and the current viewable area from a computer-readable medium. In some embodiments, the minimum width $W_{VR}$ can be equal to the default width $W_D$. At step 304, the compression engine 150 can determine or identify a quantity Q of viewable areas rendered on the display. At step 306, a product of the default width $W_D$ and the quantity Q can be calculated by the compression engine 150 and at step 308 a sum of the product and the specified minimum width $W_T$ can be calculated by the compression engine 150.

If the sum is less than a value of the width of the footprint $W_F$ (step 310), the compression engine 150 assigns each viewable area between the root viewable area and the current viewable area the default visible width at step 312 such that each of the viewable areas between the root viewable area and the current viewable area have visible portions with identical or substantially identical widths. If the sum is greater than or equal to the value of the width of the footprint $W_F$ (step 310), the compression engine 150 determines an available width $W_A$ at step 314 based on the values of the width of the footprint $W_F$, the minimum width $W_{VR}$ of the visible portion of the root viewable area, and/or the minimum width of the current viewable area $W_T$. As one example, in some embodiments, the compression engine 150 can subtract the sum of the minimum width $W_{VR}$ and the minimum width $W_T$ from the width of the footprint $W_F$. For these embodiments, the available width can correspond to a width defined by a distance between a right edge of the current viewable area and a left edge of the visible portion of the root viewable area. At step 316, the compression engine 150 can determine a compressed width $W_C$ (a width that is less than the default $W_D$) to be assigned to some or all of the visible portions of viewable areas between the root viewable area and the current (top) viewable area such that the visible portions have identical or substantially identical widths. For example, the compressed width $W_C$ can be determined by dividing the available width $W_A$ by the quantity Q of viewable areas minus two, where the two indicates that the root and current viewable areas will not be compressed. The compression engine 150 provides the compressed width $W_C$ to the rendering engine 130 and at step 318, the rendering engine 130 applies the compressed width $W_C$ to the applicable viewable areas.

Figure 4:
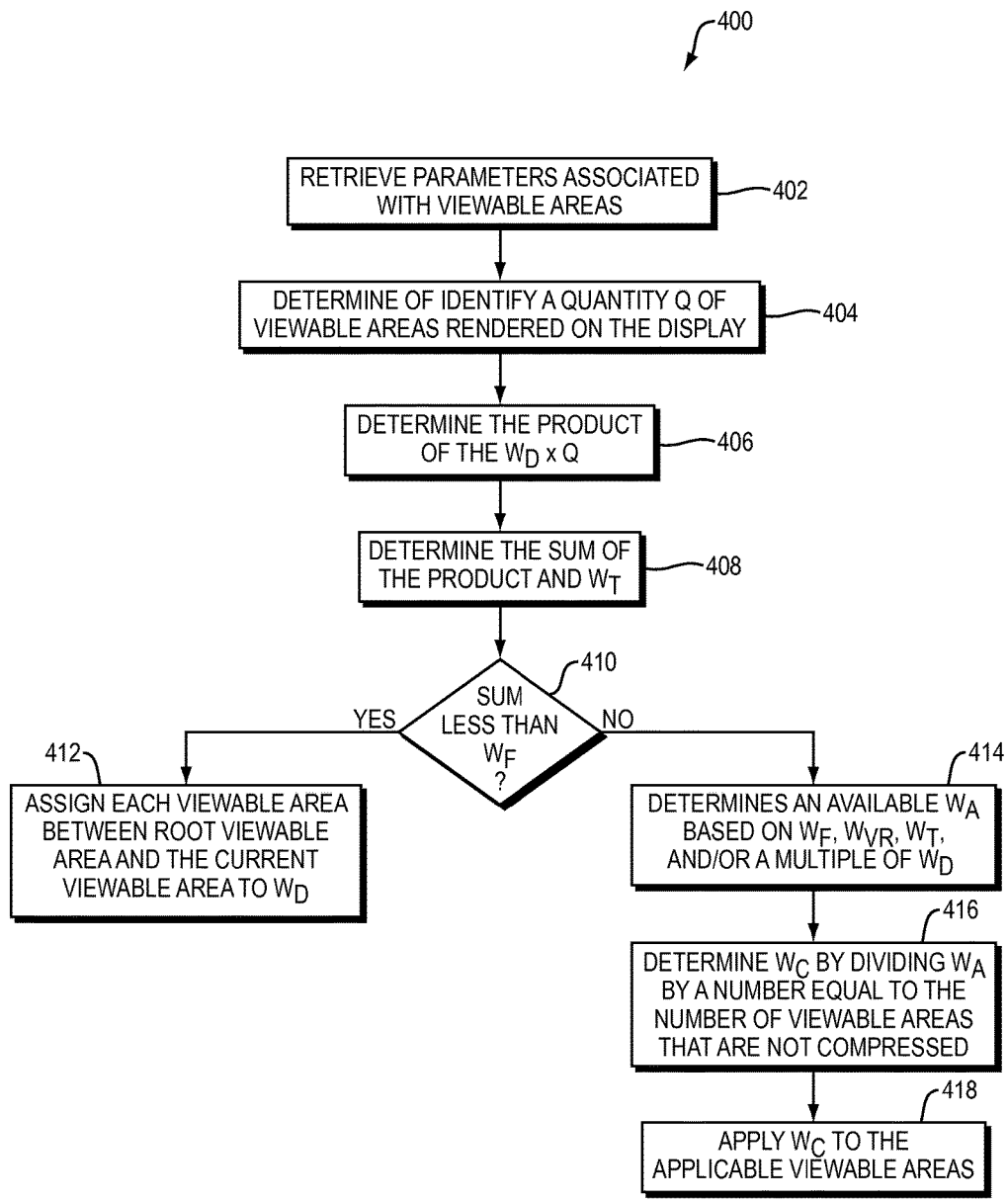
FIG. 4 is a flowchart illustrating a process implemented by another exemplary embodiment of the present disclosure for determining an overlapping arrangement of viewable areas corresponding to a hierarchical structure of underlying computer-readable content.

FIG. 4 is a flowchart illustrating another exemplary process 400 that can be implemented by the compression engine 150 using a compression criteria for determining a width of visible portions of viewable areas between the root viewable area and the current viewable area. To begin, the compression engine 150 can retrieve parameters associated with viewable areas to be rendered on a display device at step 402, including, for example, a width of the footprint $W_F$ of the root viewable area rendered on the display, a specified minimum width $W_{VR}$ for the visible portion of the root viewable area, a specified minimum width $W_T$ of a current viewable area, and/or an ideal or default width $W_D$ of the visible portion of each viewable area between the root viewable area and the current viewable area from a computer-readable medium. In some embodiments, the minimum width $W_{VR}$ can be equal to the default width $W_D$. At step 404, the compression engine 150 can determine or identify a quantity Q of viewable areas rendered on the display. At step 406, a product of the default width $W_D$ and the quantity Q can be calculated by the compression engine 150 and at step 408 a sum of the product from step 406 and the specified minimum width $W_T$ can be calculated by the compression engine 150.

If the sum is less than a value of the width of the footprint $W_F$ (step 410), the compression engine 150 assigns each viewable area between the root viewable area and the current viewable area the default visible width at step 412 such that each of the viewable areas between the root viewable area and the current viewable area have visible portions with identical or substantially identical widths. If the sum is greater than or equal to the value of the width of the footprint $W_F$ (step 410), the compression engine 150 determines an available width $W_A$ at step 414 based on at least the values of the width of the footprint $W_F$, the minimum width $W_{VR}$ of the visible portion of the root viewable area, the minimum width of the current viewable area $W_T$, and/or a multiple default width $W_D$. As one example, in some embodiments, the compression engine 150 can subtract the sum of the minimum width $W_{VR}$, the minimum width $W_T$, and a multiple of the default width (e.g., 2×$W_D$—to account for viewable areas between the root and current viewable area having visible portions that will not be compressed) from the width of the footprint $W_F$. For these embodiments, the available width can correspond to a width defined by a distance between a left edge of the viewable area a specified number of levels in depth behind the top viewable area and a right edge of the visible portion of the root viewable area (e.g., two levels). The specified number of levels behind the current (top) viewable area having visible portion that are not compressed can be configurable. At step 416, the compression engine 150 can determine a compressed width $W_C$ (a width that is less than the default $W_D$) to be assigned to the visible portions of viewable areas between the root viewable area and the viewable area the specified number of levels in depth behind (or below) the top viewable area such that the visible portions of these viewable areas have identical or substantially identical, but compressed widths. For example, the compressed width $W_C$ can be determined by dividing the available width $W_A$ by the quantity Q of viewable areas minus the number of viewable areas that will not be compressed. The number of viewable areas that will not be compressed can be determined by the widths used to compute the available width (e.g., the current viewable area, the root viewable area and two intermediate viewable area, for a total of four viewable areas). The compression engine 150 provides the compressed width $W_C$ to the rendering engine 130 and at step 418, the rendering engine applies the compressed width $W_C$ to the applicable viewable areas.

FIGS. 5-9 depict an exemplary computing device 500 programmed and/or configured to execute an electronic book reader application (e-reader application), which can implement the environment 100 in accordance with exemplary embodiments of the present disclosure to navigate a hierarchical structure of an e-book using a table of content (TOC) hierarchy. While FIG. 5-9 have been depicted to illustrate a non-limiting, exemplary implementation of an embodiment of the environment 100 for navigation of a hierarchical structure of an e-book using a table of content (TOC) hierarchy, those skilled art will recognize that embodiments of the environment 100 can be implemented in any suitable environment or application, in which computer-readable content has a hierarchical structure, to facilitate navigable layering of viewable areas for the hierarchical content.

Figure 5:
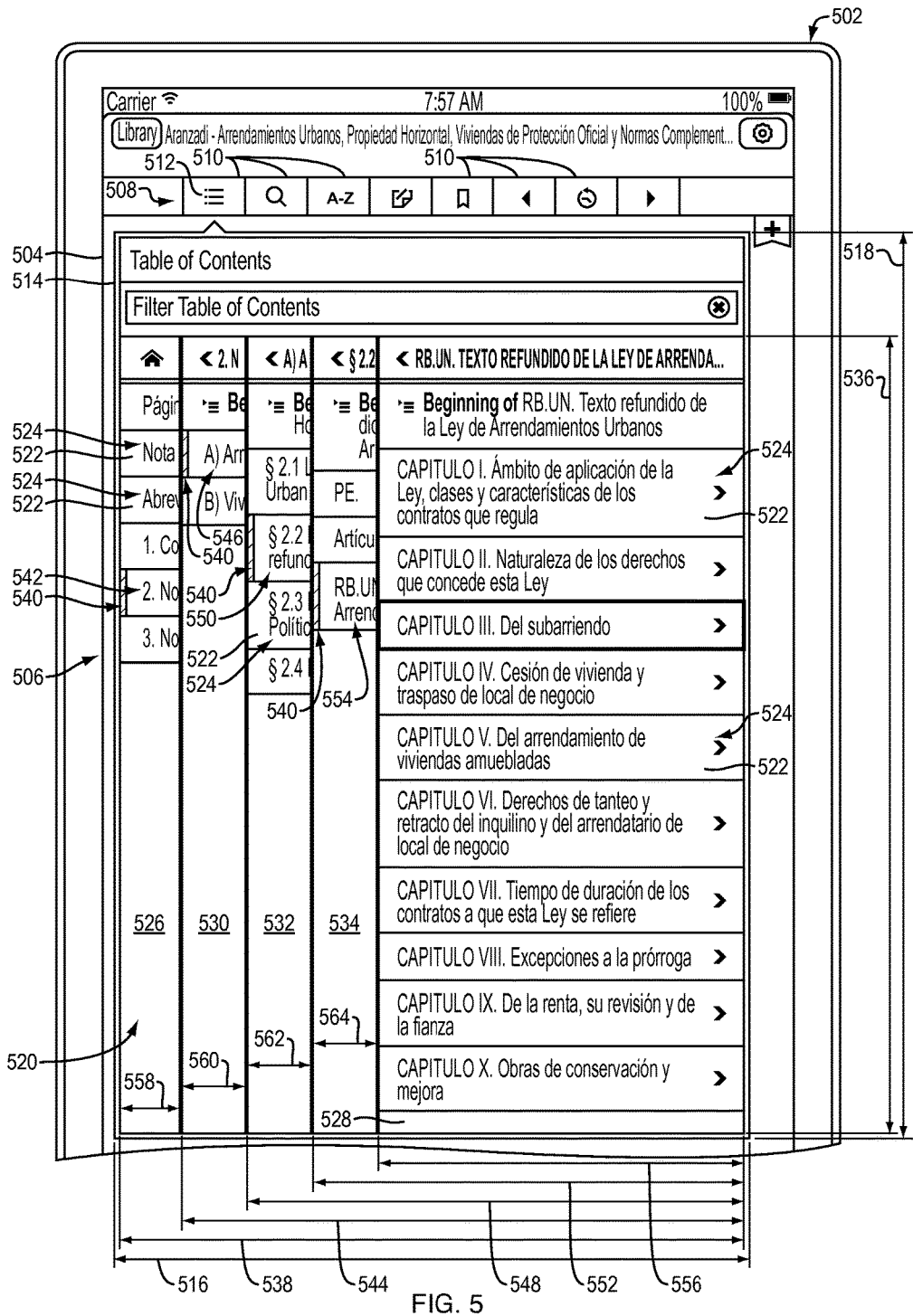
FIG. 5 depicts an overlapping arrangement of viewable areas rendered by a display device to provide a visual indication of a hierarchical structure of underlying computer-readable content.

Referring now to FIG. 5, the computing device 502 can include a display device 504 to render glyphs (e.g., texts, graphics, symbols), animations, videos, and/or any other suitable visual elements on a screen of the display device 504. In the present embodiment, the computing device can be a portable electronic device, such as a mobile phone (e.g., a smart phone), a tablet device (e.g., an iPad), and/or an e-Reader device (e.g., a Kindle) and the display device 504 can be a touch-screen that is responsive to a user's skin or a stylus device to facilitate user interaction with the computing device 502. While the display device 504 of the present embodiment is a touch-screen, those skilled in the art will recognize that the display device 504 may not be sensitive to touch such that the user can interacts with the display device via a peripheral device (e.g., a pointing device).

The computing device 502 can execute code of an e-reader application and/or the environment 100 to display a GUI 506 that allows the user to select an e-book for display by the display device 504. The GUI 506 can include a banner 508 that includes menu options 510, which can be selected by the user to cause the computing device to implement one or more operations, tasks, functions, or processes. For example, the user can select a TOC menu option 512 by touching a location on the touch-screen at which the TOC menu option 512 is rendered. In response to the selection of the option 512, the computing device 502 can execute code of the environment 100 to display a window 514 including the TOC via the screen of the display device 504. As shown in FIG. 5, the window can have a default width 516 and a default height 518, which defines an area that is less than the area provided by the dimensions of the screen of the display device 504.

Within the window 504, one or more viewable areas or slats 520 can be displayed based on a hierarchy of the TOC. Each of the slats 520 can include TOC entries 522, which are separated into rows 524. Each slat 520 can represent a level or tier in the TOC hierarchy corresponding to a path being followed by the user through the hierarchy. The slats 520 can be arranged in an offset overlapping stack arrangement to provide a visual indication of the hierarchy of the e-book as set forth by the TOC hierarchy.

As shown in FIG. 5, five slats 520 are displayed to indicate that the user has descended five levels into the TOC hierarchy of the e-book. A root slat 526 can form the bottom of the stack and the slat 528 can form a top of the stack (e.g., the foremost unobstructed slat in the stack). The slat 528 can represent a current position in the TOC hierarchy. The slats 530, 532, and 534 can be disposed between the root slat 526 and the slat 528. For example, the slat 530 can overlay the root slat 526, the slat 532 can overlay the slats 530 and 526, the slat 534 can overlay the slats 532, 530, and 526, and the slat 528 can overlay the slats 534, 532, 530, and 526.

The root slat 526 represents a root level or tier of the TOC hierarchy and includes a TOC entry 522 in each of the rows 524, which may be selectable by the user to navigate the TOC hierarchy. The root slat 526 can be rendered to have a height 536 and a width 538 to be coextensive with a defined footprint or perimeter and can be rendered with a z-depth. In FIG. 5, the slats 530, 532, 534, and 528 overlay the root slat 526 covering or obstructing a portion of the root slat 526 from view on the screen of the display device 504.

A visual indicator 540 can be disposed in one of the rows 524 corresponding to a selection of a TOC entry 542 by the user to view children TOC entries in the TOC hierarchy (displayed by slat 530) that are associated with the selected TOC entry 542. The visual indicator 540 can provide a visual reference of the path a user is following through the TOC hierarchy and can be used by the user to determine which TOC entries 522 the user selected to reach a given TOC entry in the TOC hierarchy. In exemplary embodiments, the visual indicator can be a vertical bar or rectangle position along a left edge of the row 524 corresponding to the selected TOC entry 542. The bar can be one or more colors to provide a visual indication that the TOC entry 542 was selected by the user.

The slat 530 represents a level or tier of the TOC hierarchy that forms a direct child of the root level. The slat 530 includes a TOC entry 522 in each of the rows 524, which may be selectable by the user to navigate the TOC hierarchy. The slat 530 can be rendered to have the height 536 and a width 544 as well as a z-depth. The z-depth of the slat 530 can be specified so that the slat 530 is rendered to overlay the root slat 526. The slat 530 can be aligned with a right edge of the slat 526 and the width 544 of the slat 530 can be less than the width 538 of the slat 526 such that a portion of the root slat 526 is visible (i.e. not covered or obstructed by the slat 530). In FIG. 5, the slats 532, 534, and 528 overlay the slat 530 covering or obstructing a portion of the root slat 526 from view on the screen of the display device 504. The visual indicator 540 can be disposed in one of the rows 524 corresponding to a selection of a TOC entry 546 by the user to view children TOC entries in the TOC hierarchy (displayed by slat 532) that are associated with the selected TOC entry 546.

The slat 532 represents a level or tier of the TOC hierarchy that forms a direct child of the hierarchical level represented by the slat 530. The slat 532 includes a TOC entry 522 in each of the rows 524, which may be selectable by the user to navigate the TOC hierarchy. The slat 532 can be rendered to have the height 536 and a width 548 as well as a z-depth. The z-depth of the slat 532 can be specified so that the slat 532 is rendered to overlay the slat 530. The slat 532 can be aligned with a right edge of the slat 526 and the width 548 of the slat 532 can be less than the width 544 of the slat 530 such that a portion of the slat 530 is visible (i.e. not covered or obstructed by the slat 532). In FIG. 5, the slats 534 and 528 overlay the slat 532 covering or obstructing a portion of the slat 532 from view on the screen of the display device 504. The visual indicator 540 can be disposed in one of the rows 524 corresponding to a selection of a TOC entry 550 by the user to view children TOC entries in the TOC hierarchy (displayed by slat 534) that are associated with the selected TOC entry 550.

The slat 534 represents a level or tier of the TOC hierarchy that forms a direct child of the hierarchical level represented by the slat 532. The slat 534 includes a TOC entry 522 in each of the rows 524, which may be selectable by the user to navigate the TOC hierarchy. The slat 534 can be rendered to have the height 536 and a width 552 as well as a z-depth. The z-depth of the slat 534 can be specified so that the slat 534 is rendered to overlay the slat 532. The slat 534 can be aligned with a right edge of the slat 526 and the width 552 of the slat 534 can be less than the width 548 of the slat 532 such that a portion of the slat 532 is visible (i.e. not covered or obstructed by the slat 534). In FIG. 5, the slat 528 overlays the slat 534 covering or obstructing a portion of the slat 534 from view on the screen of the display device 504. The visual indicator 540 can be disposed in one of the rows 524 corresponding to a selection of a TOC entry 554 by the user to view children TOC entries in the TOC hierarchy (displayed by slat 528) that are associated with the selected TOC entry 554.

The slat 528 represents a level or tier of the TOC hierarchy that forms a direct child of the hierarchical level represented by the slat 534. The slat 528 includes a TOC entry 522 in each of the rows 524, which may be selectable by the user to navigate the TOC hierarchy. The slat 528 can be rendered to have the height 536 and a width 556 as well as a z-depth. The z-depth of the slat 528 can be specified so that the slat 528 is rendered to overlay the slat 534. The slat 528 can be aligned with a right edge of the slat 526 and the width 556 of the slat 528 can be less than the width 552 of the slat 534 such that a portion of the slat 534 is visible (i.e. not covered or obstructed by the slat 528). In FIG. 5, the slat 528 represents the current level to which the user has navigated (i.e. the foremost unobstructed slat 534 rendered on the screen of the display device 504).

The visible portions of the partially covered or obstructed slats 526, 530, 532, and 534 can be determined by one or more configurable parameters. For example, the environment 100 can be programmed and/or configured to specify a minimum width 558 of the visible portion of the root slat 526 such that at least a portion of the root slat 526 having the minimum width 558 will be visible on the screen of the display device 504. The widths 560, 562, 564, and 556 of the visible portions of the slats 530, 532, 534, and 528, respectively, can be determined via one or more compression processes and/or algorithms and can be based on a quantity of slats being rendered on the screen of the display device 504 and/or a space between a left edge of the current slat being displayed (e.g., slat 528) and a rightmost portion of the visible portion of the root slat 526. For example, in FIG. 5, each of the visible portions of the slats 530, 532, and 534 can have an identical default width value (e.g., none of the widths 560, 562, and 564 are compressed), which in the present embodiment can be equal to the minimum width 558 of the visible portion of the root slat 526, because the quantity of the slats being display is less than a threshold value and/or because the space between a left edge of the current slat being displayed (e.g., slat 528) and a rightmost portion of the visible portion of the root slat 526 is greater less a threshold value.

As a non-limiting example, the footprint area in FIG. 5 can be segmented into five display areas arranged as vertical strips having width 558, 560, 562, 564, and 556. The width 558 of the visible portion of the root viewable area 526 can be determined by an offset applied to the left edge of the viewable area 530, the width 560 of the visible portion of the viewable area 530 can be determined by an offset applied to the left edge of the viewable area 532, and so on. The visible portion of the slat 530 can be disposed within a collapse display area. Because five viewable areas have been rendered, each visible portion of the viewable areas correspond to a display area.

The environment can render a visual indicator 566 to indicate which of the TOC entries 522 in the rows 524 of the slats 526, 528, 530, 532, and 534. The TOC entries 522 having a corresponding visual indicator 566 can be selected by the user to descend into the TOC hierarchy to view children TOC entries corresponding to the selected entry. In the present embodiment, the visual indicator 566 can be a right-facing arrow disposed along a right edge of the rows 524.

Figure 6:
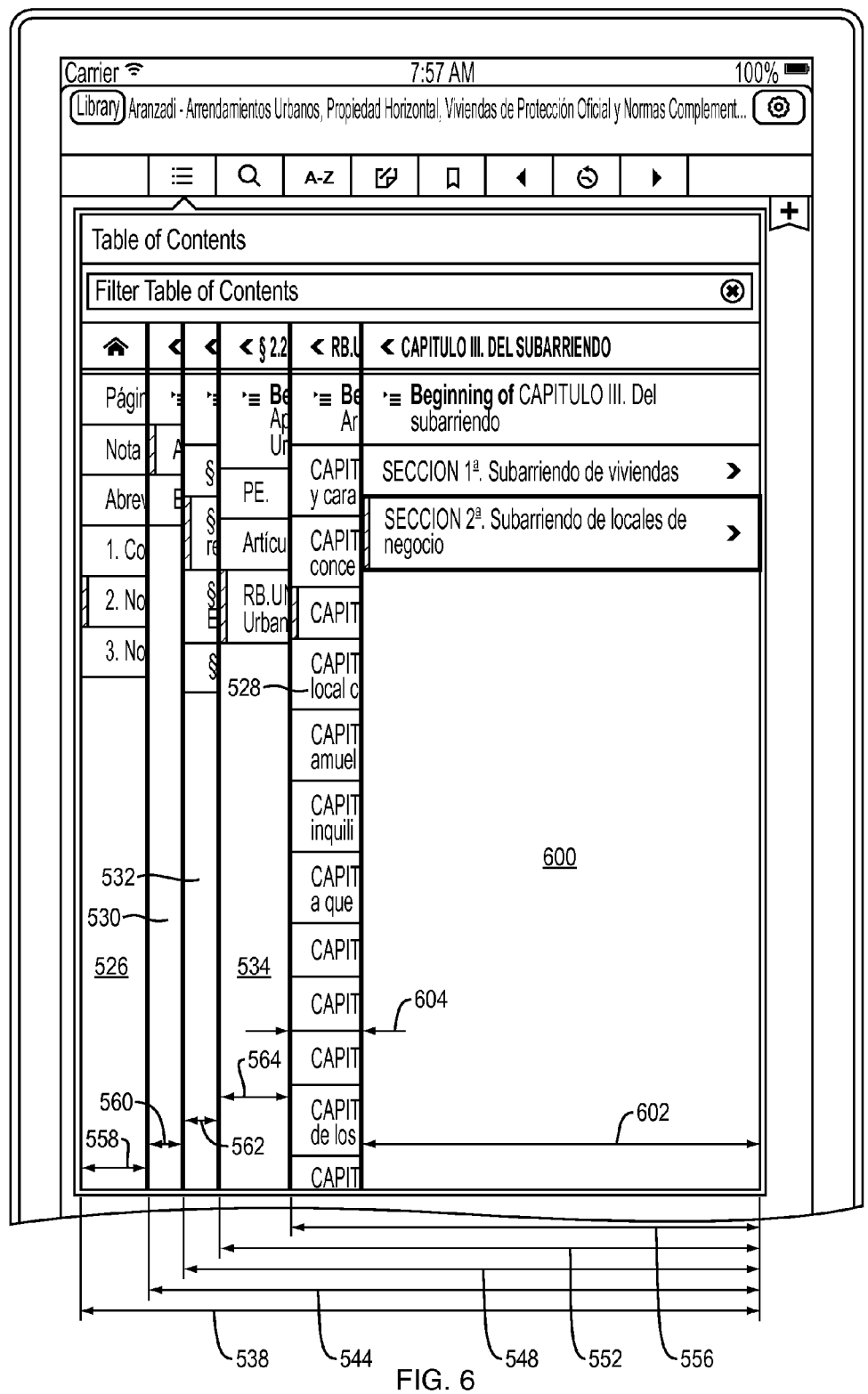
FIG. 6 depicts another overlapping arrangement of viewable areas rendered by a display device to provide a visual indication of a hierarchical structure of underlying computer-readable content.

FIG. 6 shows a new slat 600 being added to the stack of slats shown in FIG. 5 such that there are six slats being displayed and slat 600 is overlays the slat 528 and represents the current slat being viewed (e.g., the foremost unobstructed slat in the stack). The slat 600 represents a level or tier of the TOC hierarchy that forms a direct child of the hierarchical level represented by the slat 528. The slat 600 includes a TOC entry 522 in each of the rows 524, which may be selectable by the user to navigate the TOC hierarchy. The slat 600 can be rendered to have the height 536 and the width 602 as well as a z-depth. The z-depth of the slat 600 can be specified so that the slat 600 is rendered to overlay the slat 528 and the width 602 can represent the minimum width for the current unobstructed slat being rendered on the screen of the display device 504. A right edge of the slat 600 can terminate at a right edge of the footprint area.

As shown in FIG. 6, at least some of the widths of the visible portions of the slats 530, 532, and 534 can be compressed when the slat 600 is added to the stack of slats and the width 556 is increased from the minimum width for the current unobstructed slat being rendered on the screen of the display device 504 (e.g., the width 602 of the slat 600) so that at least a portion of the slat 528 is visible. The widths 560 and 562 of the visible portions of the slats 530 and 532, respectively, have been compressed (i.e. decreased) from the default widths, while the width 564 of visible portion of the slat 534 remains at the default width and the width 604 of the visible portion of the slat 528 is set to the default width. Likewise, the visible portion of the root slat 526 remains unchanged. In the present embodiment, the environment 100 can be programmed and/or configured so that two slats (e.g., the slats 534 and 528) closest to the top slat (e.g., the slat 600), as determined by the hierarchical relationship between the slats and denoted by the z-depth, do not get compressed and have visible portions with the default width.

In some embodiments, to adjust the widths of the visible portions of the slats, the offset of the left edge of the overlaying slats relative to the left edge of the footprint area can be adjusted. For example, because the width 558 of the visible portion of the root slat remains unchanged, the offset of the slat 530 remains unchanged. Similarly, because the widths 560 and 562 of the visible portions of the slats 530 and 532 are compressed, the offsets of the slats 532 and 534 are decreased, respectively (e.g., to increase the overlapping relationship of the slats 530, 532, and 534). By compressing widths 560 and 562, the environment 100 can increase the space available for the visible portions of the slats 534 and 528 and the slat 600, while still maintaining a graphical/visual representation of the TOC hierarchy and a path being followed by the user through the hierarchy.

As a non-limiting example, the footprint area in FIG. 6 can be segmented into five display areas arranged as vertical strips. Each of the visible portions of the slats 526, 528, 534, and 600 occupy a display area and the visible portions of the slats 530 and 532 occupy the collapse display area. The widths 560 and 562 of the visible portions of the viewable areas 530 and 532 can be determined by an offset applied to the left edge of the viewable areas 532 and 534, respectively. Because six viewable areas have been rendered, the collapse display area is shared by the viewable areas 530 and 532 and the remainder of the viewable areas each occupy one of the other display areas. In the present example, the widths 560 and 562 in FIG. 6 equal the width 560 in FIG. 5.

Figure 7:
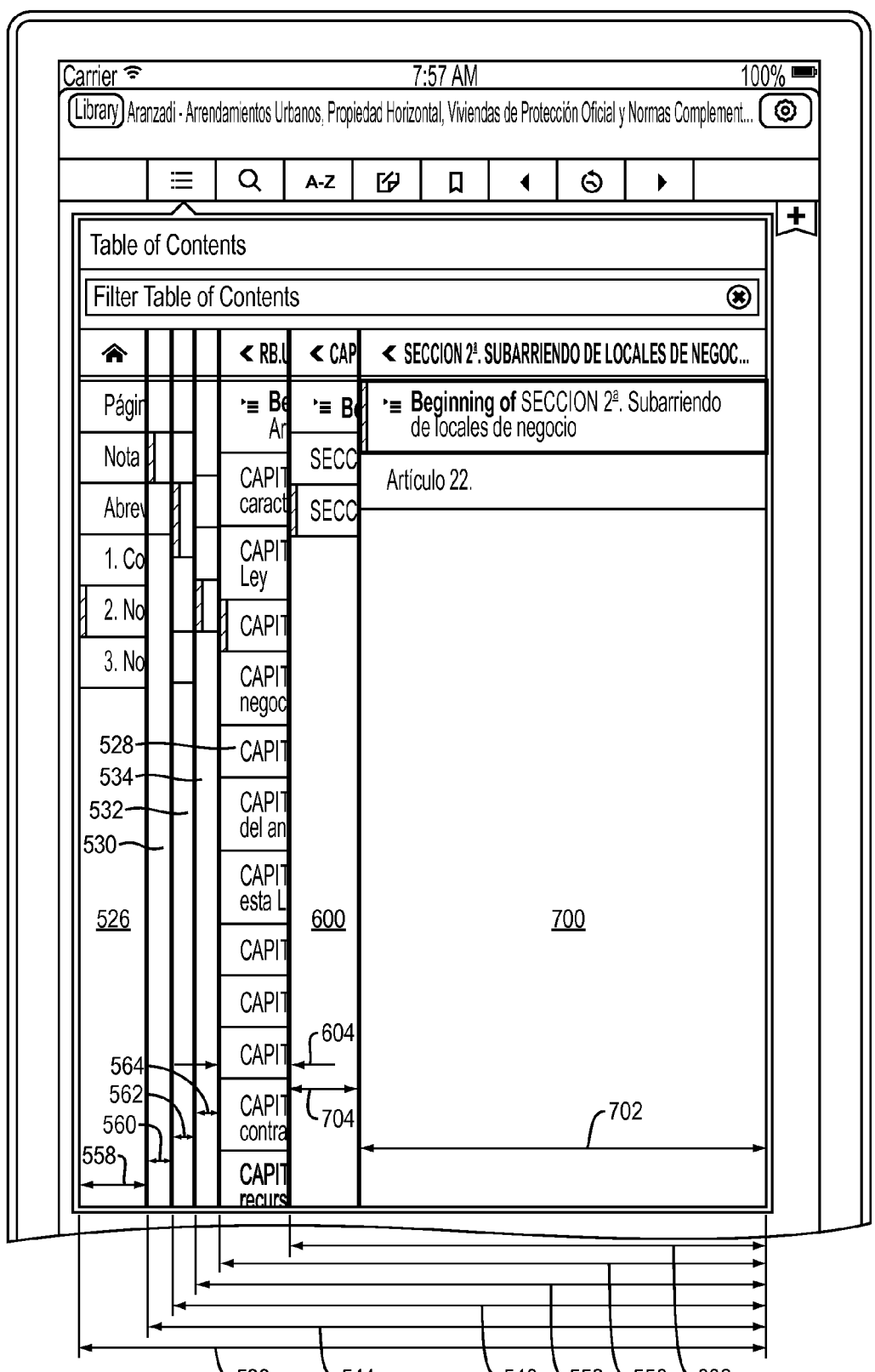
FIG. 7 depicts another overlapping arrangement of viewable areas rendered by a display device to provide a visual indication of a hierarchical structure of underlying computer-readable content.

FIG. 7 shows a new slat 700 being added to the stack of slats shown in FIG. 6 such that there are seven slats being displayed and slat 700 is overlays the slat 600 and represents the current slat being viewed (e.g., the foremost unobstructed slat in the stack). The slat 700 represents a level or tier of the TOC hierarchy that forms a direct child of the hierarchical level represented by the slat 600. The slat 700 includes a TOC entry 522 in each of the rows 524, which may be selectable by the user to navigate the TOC hierarchy. The slat 700 can be rendered to have the height 536 and the width 702 as well as a z-depth. The z-depth of the slat 700 can be specified so that the slat 700 is rendered to overlay the slat 600 and the width 702 can represent the minimum width for the current unobstructed slat being rendered on the screen of the display device 504. A right edge of the slat 700 can be aligned with a right edge of the slat 526.

As shown in FIG. 7, at least some of the offsets of the left edges of the slats can be further adjusted to compress visible portions of some of the viewable areas when the slat 700 is added to the stack of slats Widths 704 and 702 of the visible portions of the slat 600 and 700, respectively, can be set based on an offset applied to the left edge of the slats 600 and 700, respectively. The widths 560, 562, and 564 of the visible portions of the slats 530, 532, and 534, respectively, have been compressed (i.e. decreased) from the default widths, while the width 604 of visible portion of the slat 528 remains at the default width and the width 704 of the visible portion of the slat 600 is set to the default width. Likewise, the visible portion of the root slat 526 remains unchanged. In the present embodiment, the environment 100 can be programmed and/or configured so that two slats (e.g., the slats 528 and 600) closest to the top slat (e.g., the slat 700), as determined by the hierarchical relationship between the slats and denoted by the z-depth, do not get compressed and have the default width.

Because the width 558 of the visible portion of the root slat remains unchanged, the offset of the left edge of the slat 530 relative to the left edge of the footprint area remains unchanged. Similarly, because the widths 560, 562, and 564 of the visible portions of the slats 530, 532, and 534 are compressed, the offsets of the left edges of the slats 532, 534, and 528 are decreased, respectively (e.g., to increase the overlapping relationship of the slats 530, 532, 534, and 528, and 600). By compressing widths 560, 562, the environment 100 can increase the space available for the visible portions of the slats 528 and 600, while still maintaining a graphical/visual representation of the TOC hierarchy and a path being followed by the user through the hierarchy.

As shown in FIG. 7, the collapse display area can now include the visible portions of slats 530, 532, and 534 and each of the remaining slats 526, 528, 600, and 700 can occupy a separate display area. With reference to FIGS. 5-8, as more viewable areas are added to the display, more viewable areas are incorporated into the display compression area and the visible portions of the viewable areas in the display compression area decrease based on an implementation of one or more processes implemented by the environment 100 or portions thereof.

Figure 8:
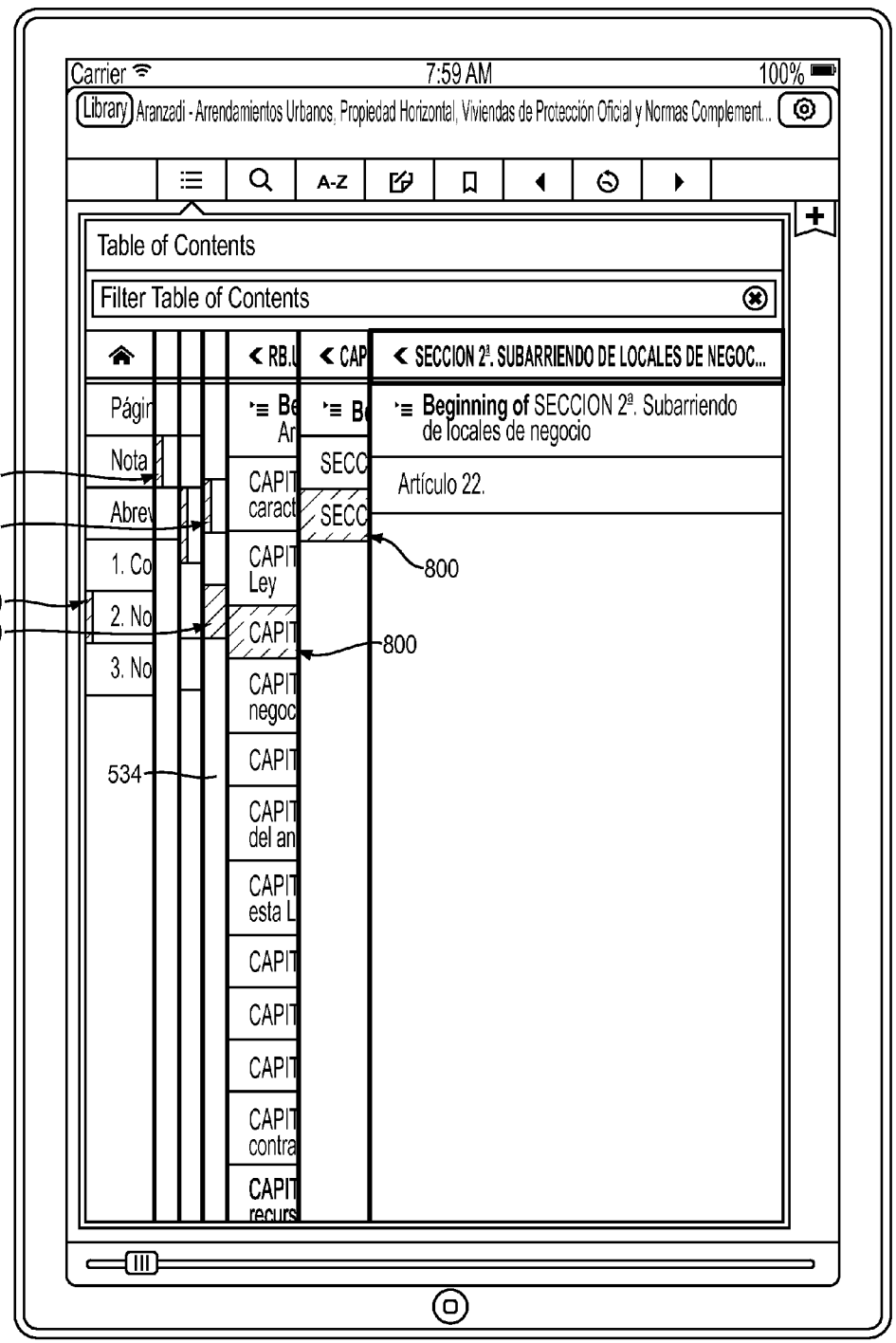
FIG. 8 depicts an overlapping arrangement of viewable areas rendered by a display device to provide a visual indication of a divergence of paths followed through a hierarchical structure of underlying computer-readable content.

FIG. 8 shows visual indicators 800 that can be rendered in the rows 524 of the slats (e.g., the slats 526, 528, 530, 532, 534, 600, and 700) in the stack to provide an visual indication of a change in the path being followed by a user in the TOC hierarchy. For example, the user can navigate through the TOC hierarchy along a path and can decide to go back in the hierarchy and navigate a different path by selecting a different TOC entry in one slats. In the present embodiment, the has navigated back to the slat 534, in which the user previously selected a TOC entry indicated by the visual indicator 540, and instead selected the TOC entry indicated by the visual indicator 800. As the user continues the descend in the TOC hierarchy, the visual indicator 800 can be used to show the path being followed in the TOC hierarchy from the slat 534. By rendering the visual indicators 540 and 800, exemplary embodiments of the environment 100 can provide a graphical/visual representation of the TOC hierarchy, the paths being followed by the user through the hierarchy, and/or deviations of the paths being followed by the user through the TOC hierarchy.

Figure 9:
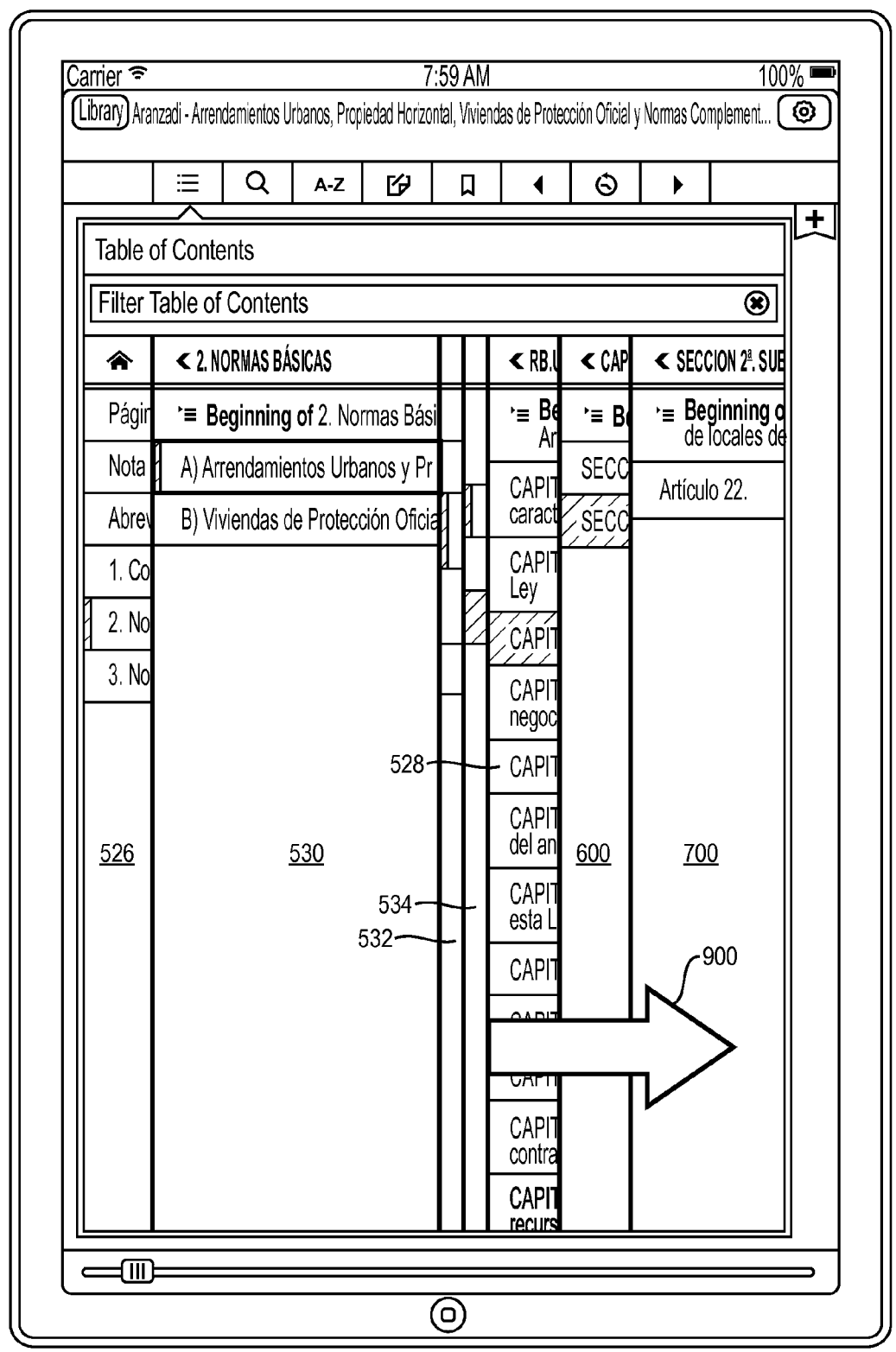
FIG. 9 depicts an overlapping arrangement of viewable areas rendered by a display device to illustrating a "peek" operation that can be implemented to view an obstructed viewable area in a stack of viewable areas representing a hierarchical structure of underlying computer-readable content.

FIG. 9 shows an implementation of an exemplary "peek" operation that can be implemented by exemplary embodiments of the environment 100 with respect to the stack of slats shown in FIGS. 7 and 8, where the slat 530 is at least partially obstructed and has a visible width of 560. As shown in FIG. 9, the user can interface with the environment 100 to slide or move the slats (e.g., the slats 532, 534, 528, 600, and 700) to the side, as illustrated by arrow 900, to view the content of the slat 530. In some embodiments, the environment 100 can be programmed and/or configured to be responsive to a user's gestures on the touch-screen of the display device 504 to implement the peek operation. For example, the user can touch the slat 532 with the user's finger or a stylus and can drag or swipe the finger or stylus to the right to reveal the underlying TOC entries included in the slat 530. When the user removes the finger or stylus from the touch screen, the environment 100 can be programmed to cause the slats to return to their specified position, for example, as shown in FIG. 8. Alternatively, the user can drag or slide the slats further to the right to dismiss the slats and remove them from the screen to go back in the hierarchy to the slat 530.

Figure 10:
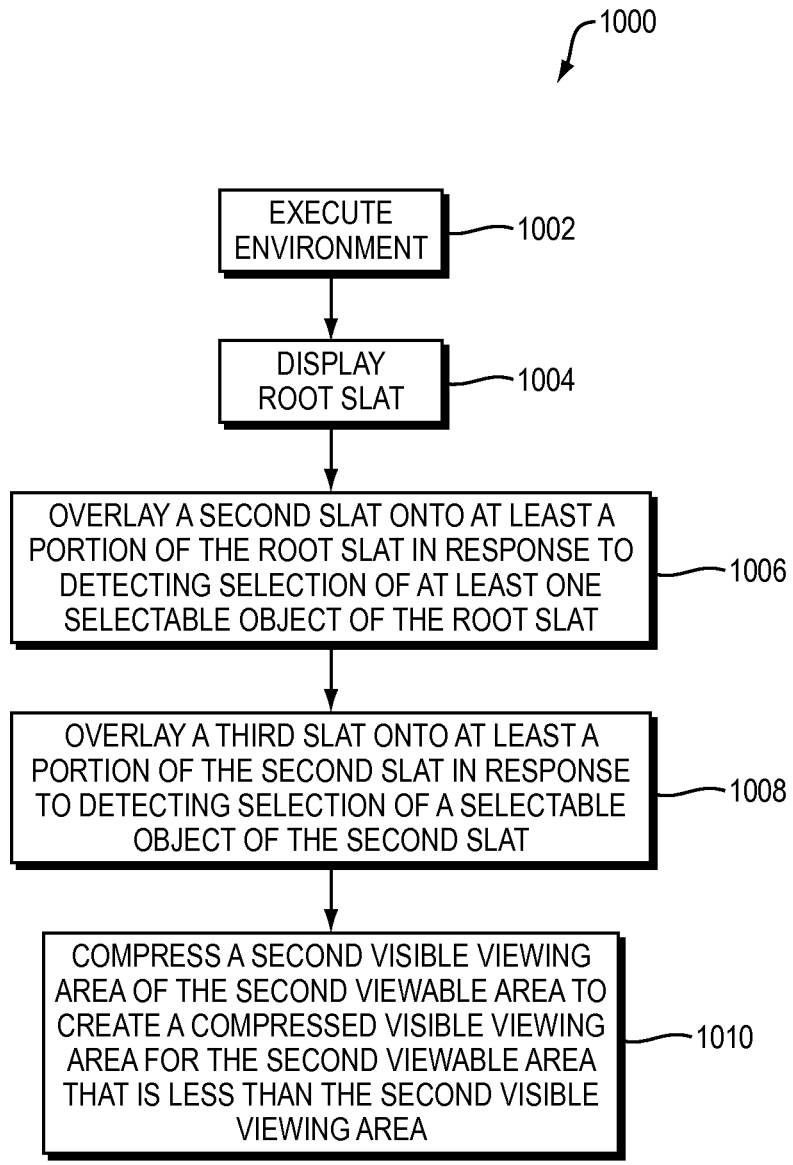
FIG. 10 is a flowchart illustrating an exemplary process implemented by exemplary embodiments of the present disclosure for render a stack of viewable areas according to a hierarchical structure of underlying computer-readable content.

FIG. 10 is a flowchart of a non-limiting example of an overall process 1000 for implementing exemplary embodiments of the environment 100 upon execution of the environment by a computing device. For example, the process 1000 can be implemented to render, on a display device, a stack of slats (i.e. viewable areas) including a first slat and a second slat disposed within a footprint corresponding to a height and a width of the first slat and to adjust the second slat in the stack based on a compression criteria to accommodate the slats of the stack within the footprint. The process 1000 can begin by allowing a user can interface with the computing device via a user interface to execute an embodiment of the environment at step 1002 to facilitate navigating a hierarchical structure of computer-readable content. At step 1004, a root slat (a root viewable area) can be displayed by the computing device. The root slat can have a footprint defined by a width and height of the slat. The root slat can include at least one selectable object corresponding to the computer-readable content at a first level in the hierarchical structure. At step 1006, the computing device can execute code of the environment to overlay a second slat (a second viewable area) onto at least a portion of the root slat to reduce a first visible viewing area of the root slat in response to detecting selection of the at least one selectable object of the root slat. The second slat can include at least one selectable object corresponding to the computer-readable content at a second level in the hierarchical structure. At step 1008, the computing device can execute code of the environment to overlay a third slat onto at least a portion of the second slat to reduce a second visible viewing area of the second slat in response to detecting selection of the at least one selectable object of the second slat. The third slat has a third selectable object corresponding to the computer-readable content at a third level in the hierarchical structure. At step 1010, the computing device can execute code of the environment to compress the second visible viewing area of the second viewable area to create a compressed visible viewing area for the second viewable area that is less than the second visible viewing area.

Figure 11:
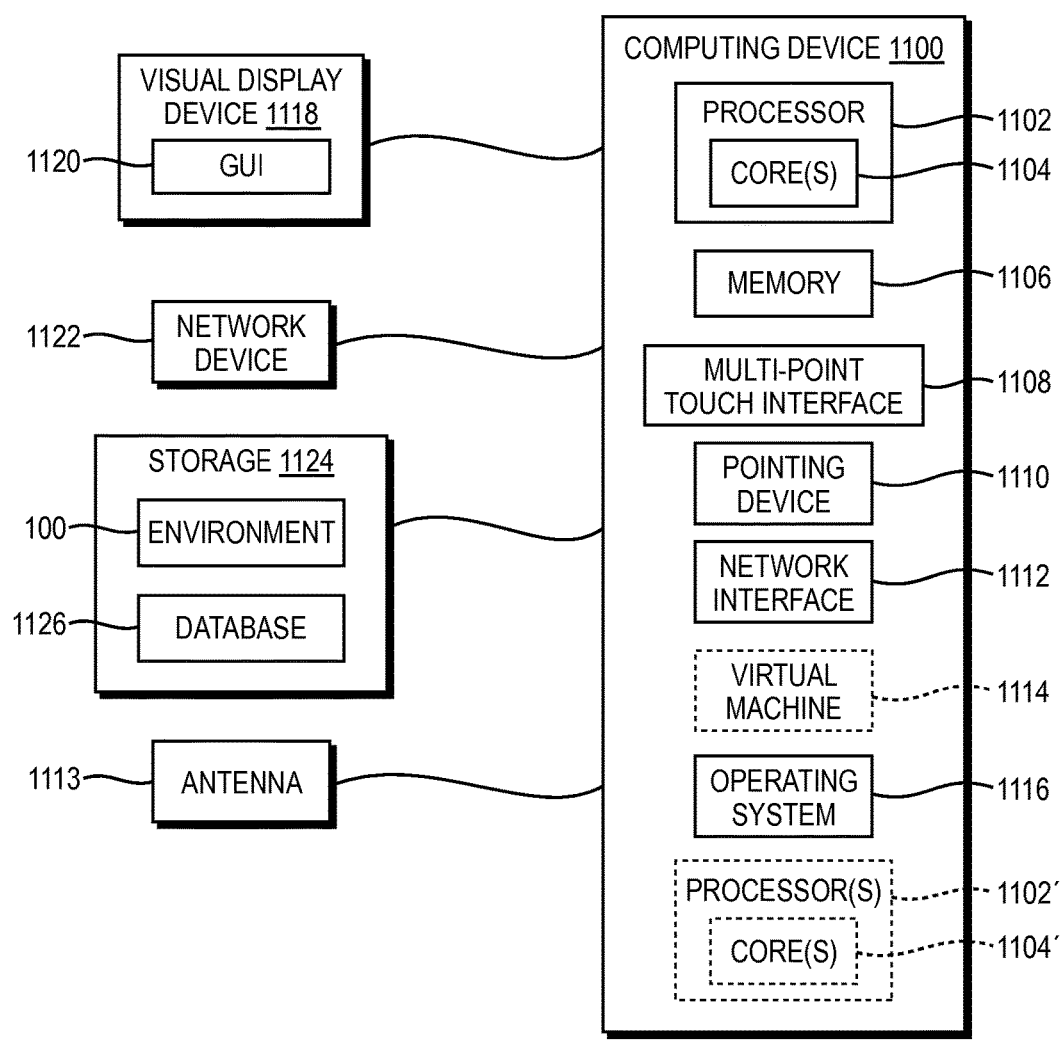
FIG. 11 is a block diagram of an exemplary computing device for implementing exemplary embodiments of the present disclosure.

FIG. 11 is a block diagram of an exemplary computing device 1100 that may be used to implement an exemplary embodiment of the environment 100. The computing device 1100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1106 included in the computing device 1100 may store computer-readable and computer-executable instructions or software for implementing exemplary embodiments of the environment 100. The computing device 1100 also includes configurable and/or programmable processor 1102 and associated core 1104, and optionally, one or more additional configurable and/or programmable processor(s) 1102' and associated core(s) 1104' (for example, in the case of computer systems having multiple processors/cores), for executing computer-readable and computer-executable instructions or software stored in the memory 1106 and other programs for controlling system hardware. Processor 1102 and processor(s) 1102' may each be a single core processor or multiple core (1104 and 1104') processor.

Virtualization may be employed in the computing device 1100 so that infrastructure and resources in the computing device may be shared dynamically. A virtual machine 1114 may be provided to handle a process running on multiple processors so that the process appears to be using only one computing resource rather than multiple computing resources. Multiple virtual machines may also be used with one processor.

Memory 1106 may include a computer system memory or random access memory, such as DRAM, SRAM, EDO RAM, and the like. Memory 1106 may include other types of memory as well, or combinations thereof.

A user may interact with the computing device 1100 through a visual display device 1118, such as a liquid crystal touch-screen (or haptic) display, a light emitting diode touch-screen display, and/or any other suitable display device, which may display one or more user interfaces 1120 (e.g., the user interface 110) that may be provided in accordance with exemplary embodiments. The computing device 1100 may include other I/O devices for receiving input from a customer, for example, a keyboard or any suitable multi-point touch interface 1108, a pointing device 1110 (e.g., a mouse). The keyboard 1108 and the pointing device 1110 may be coupled to the visual display device 1118. The computing device 1100 may include other suitable conventional I/O peripherals.

The computing device 1100 may also include one or more storage devices 1124, such as a hard-drive, CD-ROM, mass storage flash drive, or other computer readable media, for storing data and computer-readable instructions and/or software that can be executed by the processing device 1102 to implement exemplary embodiments of the environment 100 described herein. Exemplary storage device 1124 may also store one or more databases for storing any suitable information required to implement exemplary embodiments. For example, exemplary storage device 1124 can store one or more databases 1126 for storing information, such as computer-readable content, hierarchical structures of the computer-readable content, compression criteria, default and/or modified parameters and/or setting associated with viewable areas that can be displayed, and the like. The databases may be updated manually or automatically at any suitable time to add, delete, and/or update one or more items in the databases.

The computing device 1100 can include a network interface 1112 configured to interface via one or more network devices 1122 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. In exemplary embodiments, the computing device 1100 can include one or more antennas 1113 to facilitate wireless communication (e.g., via the network interface) between the computing device 1100 and a communications network. The network interface 1112 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein. Moreover, the computing device 1100 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication with other device either by wireless communication or wired communication and that has sufficient processor power and memory capacity to perform the operations described herein.

The computing device 1100 may run any operating system 1116, such as any of the versions of operating systems offered by Microsoft Inc., the different releases of the Unix and Linux operating systems, any version of operating systems offered by the Apple Corporation, any version of operating system offered by Google, Inc., any embedded operating system, any real-time operating system, any open source operating system, any proprietary operating system, or any other operating system capable of running on the computing device and performing the operations described herein. In exemplary embodiments, the operating system 1116 may be run in native mode or emulated mode. In an exemplary embodiment, the operating system 1116 may be run on one or more cloud machine instances.

Figure 12:
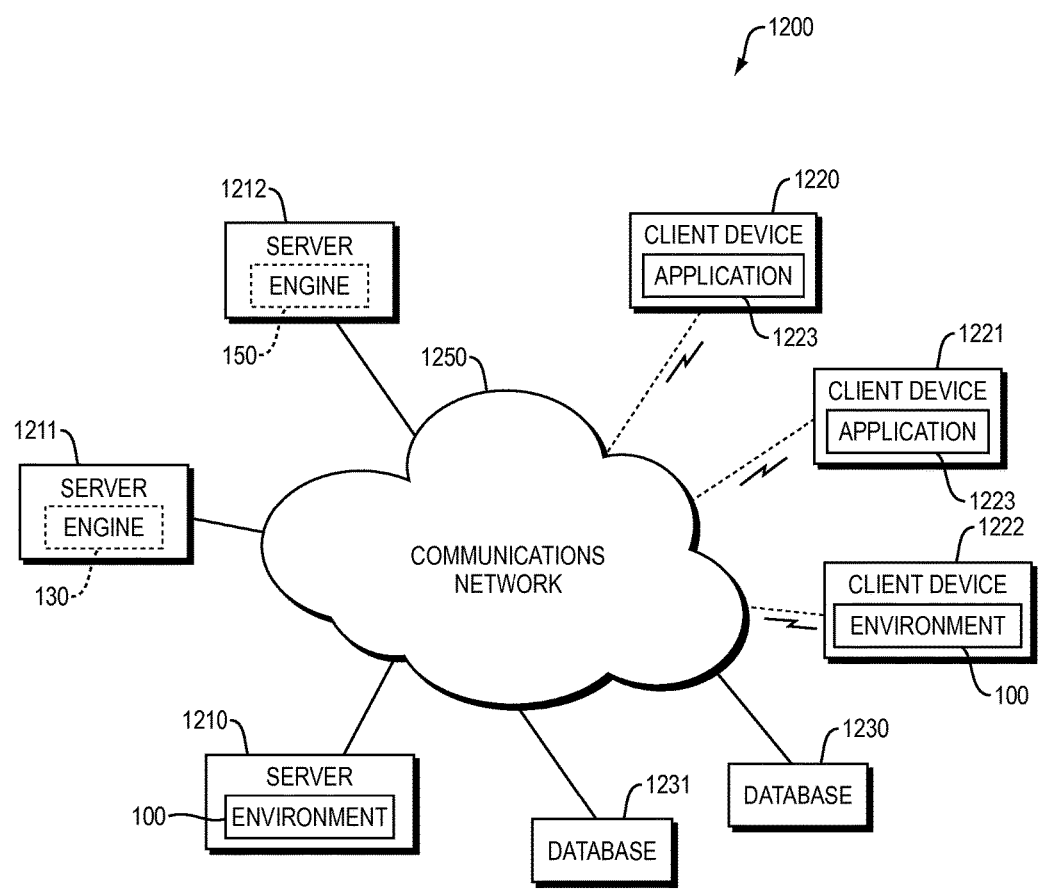
FIG. 12 is a client-server environment configured to implement exemplary embodiments of the present disclosure.

FIG. 12 is a client-server environment 1200 configured to implement one or more embodiments of the environment 100. The environment 1200 includes servers 1210-1212 operatively coupled to clients 1220-1222 via a communication network 1250, which can be any network over which information can be transmitted between devices communicatively coupled to the network. For example, the communication network 1250 can be the Internet, Intranet, virtual private network (VPN), wide area network (WAN), local area network (LAN), and the like. The environment 1200 can include repositories or databases 1230, 1231, which can be operatively coupled to the servers 1210-1212 and/or the client devices 1220-1222, via the communications network 1250. The servers 1210-1212, clients 1220-1222, and databases 1230, 1231 can each be implemented as a computing device. Those skilled in the art will recognize that the databases 1230, 1231 can be incorporated into one or more of the servers 1210-1212 such that one or more of the servers can include databases.

In an exemplary embodiment, the environment 100 can be implemented by the server 1210. In some embodiments, the environment 100 can be distributed over different servers. For example, the engine 130 can be implemented on the server 1211 and the engine 150 can be implemented on the server 1212, while the user interface can be implemented on any of the servers 1210-1212 and/or clients 1220-1222.

As shown in FIG. 12, the clients 1220-1221 can each include a client side application 1223 programmed and/or configured to interact with the server 1210 to access and execute the environment 100. The client 1222 can include the environment 100. In some embodiments, the client-side application 1223 implemented by the clients 1220-1221 can be a web-browser capable of navigating to one or more web pages hosting GUIs of the environment 100. In some embodiments, the client-side application 1223 implemented by one or more of the clients 1220-1222 can be an application specific to the environment 100 that is installed on the clients 1220-1221 to permit interaction with the environment 100 being executed by one or more of the servers 1210-1212.

The databases 1230-1231 can store information for use by the environment 1200. For example, the databases 1230-1231 can store computer-readable content, hierarchical structures of the computer-readable content, compression criteria, default and/or modified parameters and/or setting associated with viewable areas that can be displayed, and the like.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. An system for navigable layering of viewable areas corresponding to a hierarchical structure of computer-readable content, the system comprising:
   one or more non-transitory computer-readable media storing one or more programs;
   a display device including a display;
   one or more processing devices operatively coupled to the one or more non-transitory computer-readable media, the one or more processing device being programmed to execute the one or more programs to:
   define, on the display of the display device, a footprint within which a stack of overlapping viewable areas are rendered, the footprint having a height and a fixed width, the fixed width being defined between a first side of the footprint and a second side disposed opposite the first side, each of the viewable areas in the stack including rows of selectable links associated with the hierarchical relationship;
   define, on the display, within the footprint, a plurality of display areas including:
   (i) a first display area that extends the height of the footprint and extends a first portion of the fixed width of the footprint from the first side of the footprint towards the second side,
   (ii) a second display area that extends the height of the footprint and extends a second portion of the fixed width of the footprint from the second side of the footprint towards the first side, and
   (iii) third through fifth display areas arranged side-by-side between the first and second display areas, each of the third through fifth display areas extending the height of the footprint and equal fixed widths between the first and second display areas;
   render the stack of overlapping viewable areas in the footprint, a quantity of the overlapping viewable areas in the stack being equal to or greater than a threshold, the stack of overlapping viewable areas including:
   a root viewable area having the height and the width of the footprint, a visible portion of the root viewable area being rendered in the first display area;
   a top viewable area having the height of the foot print and being rendered in the second display area;
   a plurality of intervening viewable areas including first through third intervening viewable areas, the plurality of intervening viewable areas having the height of the foot print and varying widths measured from the second side of the footprint, the plurality of intervening viewable areas having z-depths that are greater than a z-depth for the root viewable area and less than a z-depth for the top viewable area, each visible portion of the first through third intervening viewable areas are rendered in a different one of the third through fifth display areas to have the equal fixed widths; and in response to selection of one of the selectable links from one of the rows in the top viewable area, adding an additional viewable area on top of the stack, wherein, in response to adding the additional viewable area to the top of the stack, (1) the visible portion of the root viewable area remains in the first display area and retains the first fixed width, (2) the visible portions of the first and second intervening viewable areas are rendered in the third display area to share the fixed width of the third display area, (3) the visible portion of the third intervening viewable area is rendered in the fourth display area to have the fixed width of the fourth display area, (4) a visible portion of the top viewable area is rendered in the fifth display area to have the fixed width of the fifth display area such that the top viewable area forms a fourth intervening viewable area when the additional viewable area is added to the top of the stack, and (5) the additional viewable area having the height of the foot print and being rendered in the second display area on top of the fourth intervening viewable area; and insert an indicator in each of the visible portions of the first through fourth intervening viewable areas corresponding to the selectable links in each of the first through fourth intervening viewable areas to identify a path of the additional viewable area currently opened in the hierarchy of the computer-readable content, with the indicator displayed beside each of the selectable links that were selected.

2. A non-transitory computer-readable medium storing instruction, wherein execution of the instructions by a processing device causes the processing device to implement a process for navigable layering of viewable areas corresponding to a hierarchical structure of computer-readable content, the instructions comprising:

code for defining, on a display of a display device, a footprint within which a stack of overlapping viewable areas are rendered, the footprint having a height and a fixed width, the fixed width being defined between a first side of the footprint and a second side disposed opposite the first side, each of the viewable areas in the stack including rows of selectable links associated with the hierarchical relationship;

code for defining, on the display, within the footprint, a plurality of display areas including:
(i) a first display area that extends the height of the footprint and extends a first portion of the fixed width of the footprint from the first side of the footprint towards the second side,
(ii) a second display area that extends the height of the footprint and extends a second portion of the fixed width of the footprint from the second side of the footprint towards the first side, and
(iii) third through fifth display areas arranged side-by-side between the first and second display areas, each of the third through fifth display areas extending the height of the footprint and equal fixed widths between the first and second display areas;

rendering the stack of overlapping viewable areas in the footprint, a quantity of the overlapping viewable areas in the stack being equal to or greater than a threshold, the stack of overlapping viewable areas including:
a root viewable area having the height and the width of the footprint, a visible portion of the root viewable area being rendered in the first display area;
a top viewable area having the height of the foot print and being rendered in the second display area;
a plurality of intervening viewable areas including first through third intervening viewable areas, the plurality of intervening viewable areas having the height of the foot print and varying widths measured from the second side of the footprint, the plurality of intervening viewable areas having z-depths that are greater than a z-depth for the root viewable area and less than a z-depth for the top viewable area, each visible portion of the first through third intervening viewable areas are rendered in a different one of the third through fifth display areas to have the equal fixed widths; and code for adding an additional viewable area on top of the stack in response to selection of one of the selectable links from one of the rows in the top viewable area, wherein, in response to adding the additional viewable area to the top of the stack, (1) the visible portion of the root viewable area remains in the first display area and retains the first fixed width, (2) the visible portions of the first and second intervening viewable areas are rendered in the third display area to share the fixed width of the third display area, (3) the visible portion of the third intervening viewable area is rendered in the fourth display area to have the fixed width of the fourth display area, (4) a visible portion of the top viewable area is rendered in the fifth display area to have the fixed width of the fifth display area such that the top viewable area forms a fourth intervening viewable area when the additional viewable area is added to the top of the stack, and (5) the additional viewable area having the height of the foot print and being rendered in the second display area on top of the fourth intervening viewable area, and code for inserting an indicator in each of the visible portions of the first through fourth intervening viewable areas corresponding to the selectable links in each of the first through fourth intervening viewable areas to identify a path of the additional viewable area currently opened in the hierarchy of the computer-readable content, with the indicator displayed beside each of the selectable links that were selected.

3. The medium of claim 2, wherein the second display area forms approximately fifty-five percent of the width of the footprint.

4. The medium of claim 2, wherein the first display area forms approximately ten percent of the width of the footprint.

5. The medium of claim 2, wherein the third through fifth display areas form approximately thirty-five percent of the width of the footprint.

6. A method of navigable layering of viewable areas corresponding to a hierarchical structure of computer-readable content, the method comprising:

defining, on a display of a display device, a footprint within which a stack of overlapping viewable areas are rendered, the footprint having a height and a fixed width, the fixed width being defined between a first side of the footprint and a second side disposed opposite the first side, each of the viewable areas in the stack including rows of selectable links associated with the hierarchical relationship;

defining, on the display, within the footprint, a plurality of display areas including:
(i) a first display area that extends the height of the footprint and extends a first portion of the fixed width of the footprint from the first side of the footprint towards the second side,
(ii) a second display area that extends the height of the footprint and extends a second portion of the fixed width of the footprint from the second side of the footprint towards the first side, and
(iii) third through fifth display areas arranged side-by-side between the first and second display areas, each of the third through fifth display areas extending the height of the footprint and equal fixed widths between the first and second display areas;

rendering the stack of overlapping viewable areas in the footprint, a quantity of the overlapping viewable areas in the stack being equal to or greater than a threshold, the stack of overlapping viewable areas including:
a root viewable area having the height and the width of the footprint, a visible portion of the root viewable area being rendered in the first display area;
a top viewable area having the height of the foot print and being rendered in the second display area;
a plurality of intervening viewable areas including first through third intervening viewable areas, the plurality of intervening viewable areas having the height of the foot print and varying widths measured from the second side of the footprint, the plurality of intervening viewable areas having z-depths that are greater than a z-depth for the root viewable area and less than a z-depth for the top viewable area, each visible portion of the first through third intervening viewable areas are rendered in a different one of the third through fifth display areas to have the equal fixed widths; and in response to selection of one of the selectable links from one of the rows in the top viewable area, adding an additional viewable area on top of the stack, wherein, in response to adding the additional viewable area to the top of the stack, (1) the visible portion of the root viewable area remains in the first display area and retains the first fixed width, (2) the visible portions of the first and second intervening viewable areas are rendered in the third display area to share the fixed width of the third display area, (3) the visible portion of the third intervening viewable area is rendered in the fourth display area to have the fixed width of the fourth display area, (4) a visible portion of the top viewable area is rendered in the fifth display area to have the fixed width of the fifth display area such that the top viewable area forms a fourth intervening viewable area when the additional viewable area is added to the top of the stack, and (5) the additional viewable area having the height of the foot print and being rendered in the second display area on top of the fourth intervening viewable area, and wherein an indicator is inserted in each of the visible portions of the first through fourth intervening viewable areas corresponding to the selectable links in each of the first through fourth intervening viewable areas to identify a path of the additional viewable area currently opened in the hierarchy of the computer-readable content, with the indicator displayed beside each of the selectable links that were selected.

7. The method of claim 6, wherein the second display area forms approximately fifty-five percent of the width of the footprint.

8. The method of claim 6, wherein the first display area forms approximately ten percent of the width of the footprint.

9. The method of claim 6, wherein the third through fifth display areas form approximately thirty-five percent of the width of the footprint.

10. The system of claim 1, wherein the second display area forms approximately fifty-five percent of the width of the footprint.

11. The system of claim 1, wherein the first display area forms approximately ten percent of the width of the footprint.

12. The system of claim 1, wherein the third through fifth display areas form approximately thirty-five percent of the width of the footprint.

* * * * *